United States Patent
Santi

(10) Patent No.: US 10,127,577 B2
(45) Date of Patent: Nov. 13, 2018

(54) SEARCH ARCHITECTURE FOR RENDERING DEEP LINKS FROM ACTION CRITERIA

(71) Applicant: Samsung Electronics Co., Ltd., Suwon-si, Gyeonggi-do (KR)

(72) Inventor: James Delli Santi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 14/986,550

(22) Filed: Dec. 31, 2015

(65) Prior Publication Data

US 2017/0193551 A1 Jul. 6, 2017

(51) Int. Cl.
*G06Q 30/00* (2012.01)
*G06Q 30/02* (2012.01)
*G06F 17/30* (2006.01)

(52) U.S. Cl.
CPC ... *G06Q 30/0256* (2013.01); *G06F 17/30867* (2013.01); *G06Q 30/0267* (2013.01); *G06Q 30/0275* (2013.01); *G06Q 30/0276* (2013.01)

(58) Field of Classification Search
CPC .......... G06Q 30/0256; G06Q 30/0276; G06Q 30/0267; G06Q 30/0275; G06F 17/30867
USPC .......... 705/14.4, 14.49, 14.72, 14.43, 14.73; 707/722
See application file for complete search history.

(56) References Cited

U.S. PATENT DOCUMENTS

| | | | | | |
|---|---|---|---|---|---|
| 5,717,923 | A | * | 2/1998 | Dedrick | G06F 17/30702 |
| 5,848,396 | A | * | 12/1998 | Gerace | G06Q 30/02 705/7.33 |
| 5,991,735 | A | * | 11/1999 | Gerace | G06Q 30/02 705/7.29 |
| 7,853,700 | B2 | * | 12/2010 | Lee | G06Q 30/02 705/7.29 |
| 7,962,604 | B1 | * | 6/2011 | Morris | G06Q 30/02 705/14.4 |
| 8,321,534 | B1 | * | 11/2012 | Roskind | H04N 21/25808 348/194 |
| 8,666,811 | B1 | * | 3/2014 | Chen | G06Q 30/00 705/14.26 |
| 2001/0029525 | A1 | * | 10/2001 | Lahr | G06F 17/30864 709/218 |
| 2002/0042738 | A1 | * | 4/2002 | Srinivasan | G06Q 30/02 705/14.43 |

(Continued)

*Primary Examiner* — Luis A Brown
(74) *Attorney, Agent, or Firm* — Jefferson IP Law, LLP

(57) ABSTRACT

A search system stores records, each identifying search functionality of a respective application. Each record includes a path to reach a corresponding search input state and includes an indication of required input parameters. A code generation module provides a first software object to a first developer for incorporation into a first state of a first application. The first software object includes instructions for, upon the first state being accessed by a user, transmitting a query to a search system with an entity corresponding to the first state and an action to be performed. The instructions receive an advertisement object from the search system in response to the query. The instructions selectively display a first user interface element in the first state based on the advertisement object. The instructions open, in response to selection by the user of the first user interface element, a designated application to a designated state.

23 Claims, 16 Drawing Sheets

(56) References Cited

U.S. PATENT DOCUMENTS

| | | | |
|---|---|---|---|
| 2003/0106022 A1* | 6/2003 | Goodacre | G06F 17/30905 715/226 |
| 2005/0096979 A1* | 5/2005 | Koningstein | G06Q 10/10 705/14.68 |
| 2005/0096980 A1* | 5/2005 | Koningstein | G06Q 30/00 705/14.41 |
| 2005/0235048 A1* | 10/2005 | Costa-Requena | H04L 29/06027 709/219 |
| 2006/0074769 A1* | 4/2006 | Looney | G06Q 30/02 705/14.66 |
| 2006/0149624 A1* | 7/2006 | Baluja | G06Q 30/0255 705/14.53 |
| 2006/0271438 A1* | 11/2006 | Shotland | G06Q 30/02 705/14.46 |
| 2007/0022442 A1* | 1/2007 | Gil | G06F 17/30905 725/62 |
| 2007/0300152 A1* | 12/2007 | Baugher | G06F 17/3089 715/210 |
| 2008/0092159 A1* | 4/2008 | Dmitriev | G06Q 30/0269 725/34 |
| 2010/0036717 A1* | 2/2010 | Trest | G06Q 30/0207 705/14.1 |
| 2010/0070373 A1* | 3/2010 | Zoeter | G06O 30/02 705/14.71 |
| 2010/0222040 A1* | 9/2010 | Bosan | G06O 30/02 455/414.1 |
| 2012/0278722 A1* | 11/2012 | Raleigh | H04L 12/14 715/735 |
| 2012/0289147 A1* | 11/2012 | Raleigh | H04L 67/2847 455/3.06 |
| 2013/0018731 A1* | 1/2013 | Morris | G06Q 30/02 705/14.66 |
| 2013/0311285 A1* | 11/2013 | Abrol | G06Q 30/02 705/14.54 |
| 2013/0337785 A1* | 12/2013 | Delug | H04W 4/60 455/414.1 |
| 2014/0172563 A1* | 6/2014 | Amit | G06O 50/01 705/14.54 |
| 2014/0236386 A1* | 8/2014 | Yoshizawa | B60W 30/08 701/1 |
| 2014/0250106 A1* | 9/2014 | Shapira | G06F 17/30864 707/722 |
| 2014/0258013 A1* | 9/2014 | Collins | G06Q 30/0625 705/26.3 |
| 2014/0258014 A1* | 9/2014 | Collins | G06Q 30/0241 705/26.3 |
| 2014/0316890 A1* | 10/2014 | Kagan | G06O 30/0256 705/14.54 |
| 2015/0095160 A1* | 4/2015 | Ma | G06O 30/0267 705/14.64 |
| 2015/0134436 A1* | 5/2015 | Lambert | G06Q 30/00 705/14.26 |
| 2015/0161149 A1* | 6/2015 | Genera | G06F 17/3087 707/711 |
| 2015/0193546 A1* | 7/2015 | Lipton | G06F 8/61 717/178 |
| 2015/0227633 A1* | 8/2015 | Shapira | G06F 17/30395 707/706 |
| 2015/0254367 A1* | 9/2015 | Kagan | G06F 3/0482 707/706 |
| 2015/0371263 A1* | 12/2015 | Kagan | G06O 30/0256 705/14.54 |
| 2016/0034957 A1* | 2/2016 | Kagan | G06O 30/0256 705/14.54 |
| 2016/0063535 A1* | 3/2016 | Xu | G06O 30/0241 705/14.4 |
| 2016/0085521 A1* | 3/2016 | Savliwala | G06F 17/30867 717/108 |
| 2016/0092919 A1* | 3/2016 | Coleman, Jr. | G06Q 30/0255 705/14.53 |
| 2016/0162555 A1* | 6/2016 | Shapira | G06F 17/30554 707/722 |
| 2016/0313893 A1* | 10/2016 | Xu | G06F 3/0481 |
| 2017/0140421 A1* | 5/2017 | Filev | G06Q 30/0247 |
| 2017/0178038 A1* | 6/2017 | Guven | G06Q 10/0635 |

\* cited by examiner

SEARCH ARCHITECTURE FOR RENDERING DEEP LINKS FROM ACTION CRITERIA

FIELD

The present disclosure relates to a search architecture and method of operation for generating advertisements with deep links to mobile applications.

BACKGROUND

In recent years, the use of Internet-connected devices such as smartphones has grown exponentially. The number and variety of available software applications for such devices has similarly grown by orders of magnitude. Presently, many diverse functions can be performed, and many diverse sets of data can be analyzed on any given Internet-connected device. The applications that offer this functionality and data span business-oriented applications, educational applications, games, new applications, shopping applications, messaging applications, media streaming applications, social media applications, etc.

Advertising faces new challenges for mobile devices. The amount of screen real estate is significantly smaller, meaning that fewer and more relevant ads need to be selectively shown. Further, ads that simply point to a web page may not create a seamless user experience as ads with deep links that go directly to a particular state of an app. However, there is no single standard for deep links and no magic answer for relevance. As a result, there is a need in the industry for improving search results that can be used for advertising purposes. The search results can be obtained by performing a search based on a perceived intent of a user to increase relevance. Therefore, there is a need for improved relevancy for mobile ads, both in websites visited from a mobile device and native apps running on a mobile device.

Digital marketing and advertising helps drive today's economy. One reason that advertisers find more value in digital advertising over traditional forms of advertising, such as print and television advertising, is that digital advertising allows advertisers to better target potential consumers. For instance, if the advertiser knows a particular user likes an obscure sport such as disc golf, the advertiser may provide disc golf related advertisements to the user. This user would typically not be presented with such advertisements, unless the advertiser was aware of the user's preferences. As users become more reliant on native applications, the ability to advertise and link to deep states of applications helps advertisers as well as users.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A search system includes a search function data store configured to store a plurality of records. Each record identifies search functionality of a respective application, includes a path to reach a search input state corresponding to the identified search functionality within the respective application, and includes an indication of required input parameters to be supplied in the search input state to access the identified search functionality. The search system includes a code generation module configured to provide a first software object to a first developer for incorporation into at least a first state of a first application. The first software object includes instructions for, upon the first state being accessed by a user, transmitting a query to a search system. The query includes information indicating (i) an entity corresponding to the first state and (ii) an action to be performed on the entity. The first software object includes instructions for receiving an advertisement object from the search system in response to the query. The advertisement object includes an access mechanism that designates a state of an application. The first software object includes instructions for selectively displaying a first user interface element in the first state based on the advertisement object. The first software object includes instructions for, in response to selection by the user of the first user interface element, opening an application designated by the access mechanism to a state designated by the access mechanism. The search system includes a search function matcher configured to, in response to a first query from a user device, select a set of records from the search function data store. The search system includes a native search system configured to, for each record of the set of records, control an emulator to navigate the application specified by the record to the search input state specified by the record, supply the required input parameters to the search input state specified by the record, perform a search, and scrape content from a resulting state to produce a content object. The content object includes a path to a first result specified by the resulting state.

The search system includes a bid selection system configured to determine bid prices for each of the content objects from the native search system and select a highest bid price. The search system includes a presentation system configured to transmit an advertisement object to the user device based on the content object corresponding to the highest bid price. In other features, the first query includes context and the bid selection system is configured to determine the bid prices based on the context. In other features, the context includes at least one of a location of the user device and an identification of operating system of the user device.

In other features, the records of the search function data store are categorized by function, the first query includes an identifier of a specified function, and the search function matcher is configured to select records from the search function data store that match the specified function. In other features, the search system includes a user interest finder configured to receive the first query from the user device and identify one or more types of entities included in the first query. The search function matcher is configured to select records from the search function whose required input parameters match the identified one or more types of entities.

In other features, for each record of the plurality of records, the path includes a sequence of user interface interactions beginning with a home state of the respective application. In other features, opening the application includes one of (i) opening a web browser on the user device for a web edition of the application and (ii) opening a native edition of the application on the user device. In other features, for each record of the set of records, the content object also includes text and an image, the text is unique to the first result, the advertising object includes the text and the image.

In other features, each record of the plurality of records includes a mapping of the required input parameters to user interface widgets of the search input state. In other features, the first software object includes instructions for, in response to no results being obtained for a first function, signaling non-availability of the first function by one of (i) hiding the first user interface element and (ii) lightening a shade of text of the first user interface element and disabling any action associated with the first user interface element. In other features, the first software object includes instructions for displaying an indicator of the action as well as the application associated with the first user interface element.

In other features, the presentation system is configured to transmit an advertisement object to the user device based on the content objects corresponding to N highest bid prices. N is an integer. The advertisement object includes N access mechanisms, each designating a respective state of a respective application. The first software object includes instructions for, in response to selection by the user of the first user interface element, displaying a list of the N access mechanisms. The first software object includes instructions for, in response to selection by the user of a first access mechanism from the list, opening the respective application designated by the first access mechanism to the respective state designated by the first access mechanism. In other features, the first developer is a web developer, the first application is a website, the first state is a page of the website, and the first software object includes JavaScript instructions.

A method of operating a search system includes storing a plurality of records. Each record identifies search functionality of a respective application, includes a path to reach a search input state corresponding to the identified search functionality within the respective application, and includes an indication of required input parameters to be supplied in the search input state to access the identified search functionality. The method includes providing a first software object to a first developer for incorporation into at least a first state of a first application. The first software object includes instructions for, upon the first state being accessed by a user, transmitting a query to a search system. The query includes information indicating (i) an entity corresponding to the first state and (ii) an action to be performed on the entity. The first software object includes instructions for receiving an advertisement object from the search system in response to the query. The advertisement object includes an access mechanism that designates a state of an application. The first software object includes instructions for selectively displaying a first user interface element in the first state based on the advertisement object. The first software object includes instructions for in response to selection by the user of the first user interface element, opening an application designated by the access mechanism to a state designated by the access mechanism. The method includes in response to a first query from a user device, selecting a set of records from the stored records. The method includes, for each record of the set of records, controlling an emulator to navigate the application specified by the record to the search input state specified by the record, supplying the required input parameters to the search input state specified by the record, performing a search, and scraping content from a resulting state to produce a content object. The content object includes a path to a first result specified by the resulting state. The method includes determining bid prices for each of the content objects. The method includes transmitting an advertisement object to the user device based on the content object corresponding to the highest bid price.

In other features, the first query includes context. The method includes determining the bid prices based on the context. The context includes at least one of a location of the user device and an identification of operating system of the user device. In other features, the stored records are categorized by function. The first query includes an identifier of a specified function. Each of the set of records is selected from the stored records based on the categorization of the record matching the specified function. In other features, the method includes identifying one or more types of entities included in the first query. Each of the set of records is selected from the stored records based on the respective search function having required input parameters that match the identified one or more types of entities.

In other features, for each record of the plurality of records, the path includes a sequence of user interface interactions beginning with a home state of the respective application. In other features, opening the application includes one of (i) opening a web browser on the user device for a web edition of the application and (ii) opening a native edition of the application on the user device. In other features, for each record of the set of records, the content object also includes text and an image, the text is unique to the first result, and the advertising object includes the text and the image.

In other features, each record of the plurality of records includes a mapping of the required input parameters to user interface widgets of the search input state. In other features, the first software object includes instructions for, in response to no results being obtained for a first function, signaling non-availability of the first function by one of (i) hiding the first user interface element and (ii) lightening a shade of text of the first user interface element and disabling any action associated with the first user interface element. In other features, the first software object includes instructions for displaying an indicator of the action as well as the application associated with the first user interface element.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
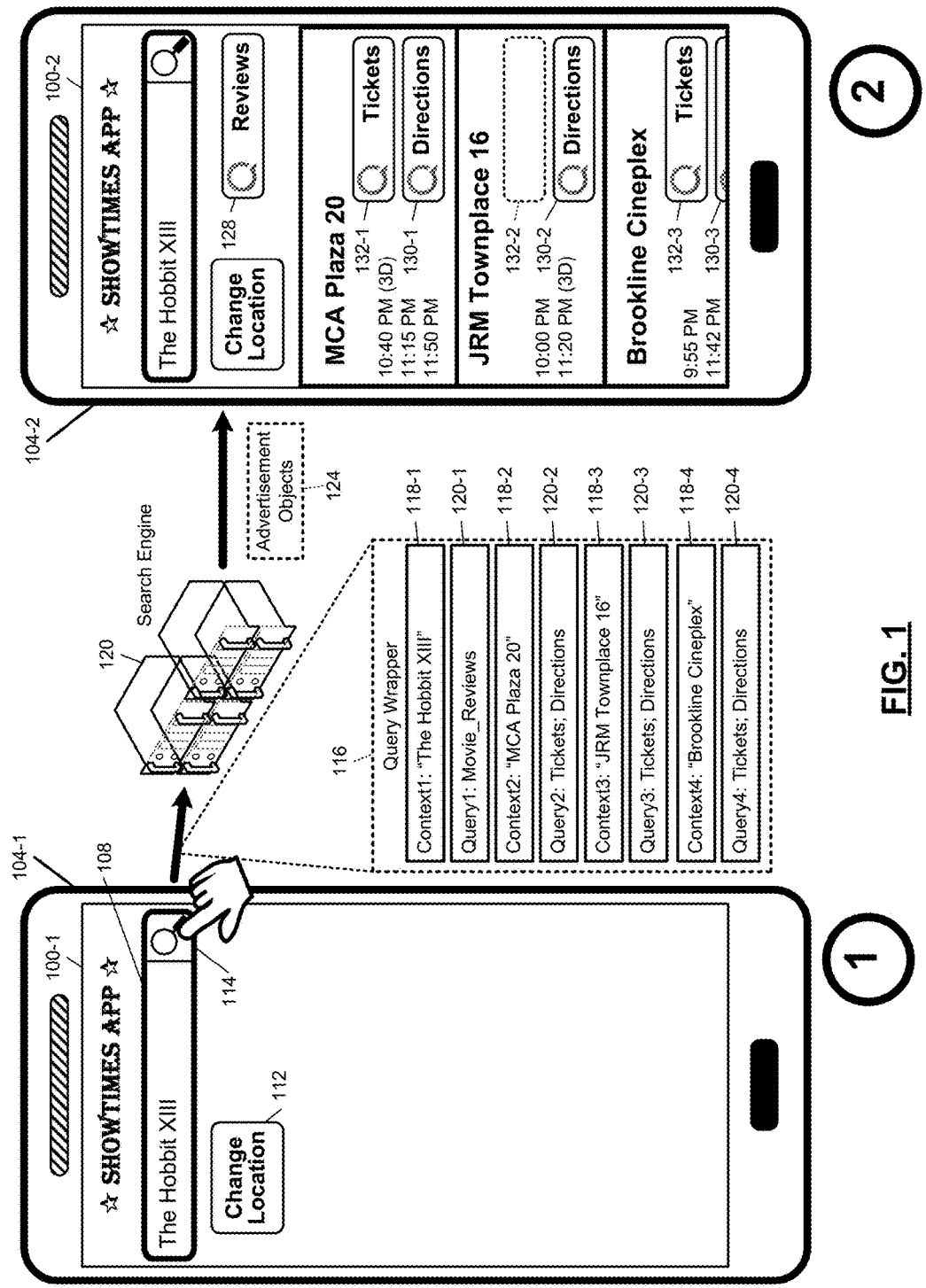
FIG. 1 is a simplified functional block diagram with graphical user interface examples according to the principles of the present disclosure.

When an advertisement system prepares an ad for a user, the advertising system may attempt to determine an entity that the user is interested in. In some cases, such as for search advertising, the entity may be named in the search string typed in by the user. In other situations, such as page advertising, the advertisement system may not have a text string from the user and instead determines the entity based on the contents of the page or state the user is viewing.

The advertising system may maintain a knowledge graph to determine which entity the user is interested in as compared with simply a set of key words or key phrases. For example, the knowledge graph may include indices of entities for various descriptors for various industry verticals. For example, for the film industry, a set of movie titles may be maintained. In this way, the advertisement system recognizes that "The Bridges of Madison County" is a movie title and is less likely to be a search for elevated roadways in a certain county.

However, knowing the entity still does not indicate to the advertisement system what action the user would like to perform with respect to that entity. Further, the entity is not always clear from a textual description. For example, if the advertisement system recognizes that the user is interested in "Iron Man," the advertisement system may not be completely confident that the user is interested in the movie Iron Man instead of the comic book Iron Man.

Even if the advertisement system were able to infer that the movie was the specific entity of interest, the advertisement system would not know whether the user might be interested in buying Iron Man physical media, renting Iron Man, buying Iron Man movie merchandise, buying tickets to the latest Iron Man sequel, or simply reading reviews of Iron Man. If the advertisement system knew the action of interest to the user, the advertisement system could prepare a more relevant advertisement. In addition, knowing the action of interest may allow the advertisement system to narrow the potential entities. For example, if a user is interested in streaming Iron Man, then the advertisement system can be confident that the user is interested in the movie Iron Man.

Specifying an action also allows for more competitive bidding to take place. The advertisement system may accommodate a number of advertisers who may all be interested in providing functionality to the user with respect to Iron Man. However, the various actions may have significantly different potential associated revenue and therefore have different bidding prices. For example, at the time that Iron Man is in theaters, the potential average revenue from a movie ticket sales app could be $20 or $30. Meanwhile, the potential revenue for a movie reviews app would be much lower, based on display advertising and ad click-throughs generated by a user reading reviews on the site.

Therefore, if both advertisers are bidding for the Iron Man movie entity, the movie tickets app or site may always prevail. This is problematic for the movie review site, which may have better reviews but no ability to outbid the movie tickets app. This may also be disadvantageous to the movie tickets app when the movie tickets app bids for the Iron Man movie entity, but the user is only interested in movie reviews.

If the users' intended actions were known, movie reviews apps and movie tickets apps that show reviews could both bid competitively for review traffic, while movie tickets apps could bid only with each other for movie tickets traffic. This segmenting of the market may lead to greater revenues for the advertisement system, greater relevancy of ads and therefore greater conversion rates for advertisers, and a better user experience.

The developer of a website or an app can determine user intent by placing a user interface (UI) element in a state (or, page) of the app or site that has a specific action associated with it. For example, the (UI) element may be a button. In one specific example described below, a developer of a movie showtimes app (and corresponding website) may present showtimes for a movie.

On the state where a particular movie's showtimes are presented, the developer may place a buy tickets button and a find reviews button. When the user clicks on the buy tickets button, their intended action is fairly clear, as it would be when clicking on the reviews button. Based on this specific intent, the advertisement system can choose which among a set of bidders has bid the highest price for this particular entity.

The bid price may be based on other context information, such as gender, age, and other demographic information. Other contextual information that may affect the bid price is location, operating system of the user device, and operating system version of the user device. For example only, some advertisers may be willing to spend less money for users with devices of a lower cost operating system and for users of an older version of an operating system. Further, an advertiser may increase their bid if their app is not yet installed on the user's device.

The advertisement system may determine the winning bid at the time the user selects the button or may determine the winning bid at the time the button is rendered in the state. In situations where the winning bidder is determined at the time of displaying the button to a user, an opportunity for branding is presented. The button could be modified to indicate the winning bidder. For example, if the Flixster app is the winning bid for a movie tickets button, the button may be modified to show the name and logo of Flixster.

The advertisement system may also add branding to the button, making the button co-branded. For example, the button may include the action to be taken (such as "Buy Tickets") and also an icon or other indicator of the advertisement system or the technology underlying the advertisement system. For example, a stylized Q may be included to indicate association with Quixey, Inc. of Mountainview, Calif.

In order for the advertisement system to provide reliable deep links to an advertiser's app, the advertiser may need to submit their app to the advertisement system for an intake process, sometimes referred to as onboarding. For more information about example onboarding processes, see commonly-assigned U.S. patent application Ser. No. 14/980,763, filed Dec. 28, 2015, titled App Onboarding System for Developer-Defined Creation of Search Engine Results," and with first-named inventor Nofar Levi, the entire disclosure of which is incorporated by reference.

The advertising developer may specify an action that the advertising developer wants to bid for, such as buy movie tickets. However, the advertisement system may not be aware of every single entity for which the advertising developer supports that action. Instead of scraping and crawling the entire set of entities of the advertising developer, the advertisement system may perform dynamic acquisition in response to a potential advertisement. Because searches are performed to determine advertisements, the advertisement system can be referred to as a search system with a search engine.

If, for simplicity, the advertising developer's app is called "App B," then, upon potential user interest in an action provided by App B, the advertisement system can query App B and determine whether App B can perform that action with respect to App B. Continuing the movie tickets example, where App B allows for the purchase of movie tickets, the advertisement system performs a search in App B for the movie the user is interested in.

The advertisement system may maintain a set of emulators or devices, one or more of which executes App B. Emulators and devices, such as a cloud system of emulators or hardware devices, are described in more detail in commonly-assigned U.S. patent application Ser. No. 14/981,244, titled Dec. 28, 2015, filed "Cloud-Enabled Architecture for On-Demand Native Application Crawling," with first-named inventor Kalyan Desineni, the entire disclosure of which is incorporated by reference.

Within the copy of App B, the advertisement server navigates to a search input state, where the name of the movie is supplied. The advertisement system performs a search and reviews results from App B. If an error message or no results are returned, the advertisement system does not present an advertisement from App B for the desired action. However, if results are returned, then the top result from App B may be used in the advertisement.

The advertisement system may perform similar searches in other apps having similar functionality. Each of the top results from each app is considered for the advertisement. Each advertising developer may have provided a bid price or inputs to a formula for obtaining bid price. The bid prices are calculated for each of the gathered results and the highest bid price is selected.

The app having the highest bid price is returned to the user either as a branded button or as an action to be performed when the button is selected. In other implementations, the advertisement system may present all or a subset of the gathered results. These may be presented to the user in order of decreasing bid price for the user to select. In various implementations, the number of returned results may be limited to a specific number, such as three, or may be limited based on available screen real estate.

In various implementations, the advertisement system may query apps from developers other than the advertisers and may query apps that are not presently running campaigns. Results from these non-advertising apps may be assigned a bid value of $0. If there are no non-zero bid results, then a result from one of the non-advertising apps may be returned. This may improve the customer experience and therefore encourage developers to integrate the advertisement system into their apps and web pages. In other words, the advertisement system provides deep link results that allow a user to perform an action, even if there are no active advertisers offering that particular action.

The advertisement system does not necessarily have to establish the standard for deep links. The advertisement system could support whatever deep linking standard each bidding developer specifies. In web search advertising, an advertiser generally adds a single URL for each ad because there is a single standard syntax for a web URL. In the deep view world, the app advertiser may post their own deep link URI for the advertisement system to work with.

In various implementations, the developer may add multiple action-specific buttons to a state of the app under development. For actions that are not available for a given entity, the corresponding buttons may be removed to conserve screen real estate. Removal/invisibility of buttons may be especially useful when functions are potentially mutually exclusive. For example, movies are generally not both playing in theatres and available for legal streaming. Therefore, advertisements for streaming viewing of a movie and buying movie tickets for a movie will generally not be available simultaneously, at least in the same geographical market. Meanwhile, movie merchandise could cross-sell (accompany) both. For example, a deep view to buy an Iron Man action figure could co-exist with either streaming or buying tickets for Iron Man 1 and Iron Man 5, respectively.

The developer, however, can include both buttons in every state of their app related to movies and rely on the advertisement system to identify which functions are available for that entity. This may also automatically accommodate uncommon circumstances, such as a movie being available for streaming at the same time the movie is playing in a second-run theatre.

The query to the advertisement system may be executed in parallel with one or more other queries the developer's app may perform in order to render a state. In various implementations, the developer's app may query a backend server maintained by the developer to obtain data to populate the state. For example, a movie showtimes app would generally not maintain a local database of all possible showtimes for all possible movies, instead consulting a server to obtain showtimes based on user interest. While the showtimes are being retrieved from the server, the advertisement system according to the present disclosure can identify which action or actions are available for the entity identified within the application state.

User Interface

In FIG. 1, an unsophisticated Showtimes App 100 is shown running on a user device, such as smartphone 104. A first state of the Showtimes App 100 is shown at 100-1, and the corresponding reference numeral for the smartphone 104 is 104-1. In the simple interface of the Showtimes App 100-1, a search bar 108 identifies the movie for which showtimes are being displayed (a fictional "The Hobbit XIII") and allows the user to search for a different movie. The Showtimes App 100 may search for theaters around the present location of the smartphone 104 but may allow for the user to change the specified location using a "Change Location" button 112.

When a user of the Showtimes App 100 selects (such as by tapping their finger on a magnifying glass icon 114) the entity to be searched, a query wrapper 116 is sent to a search engine 120. In various implementations, the Showtimes App 100 may first determine theaters that are showing the selected entity ("The Hobbit XIII") before sending the query wrapper 116. In other implementations, the Showtimes App 100 will send the movie entity in the query wrapper 116 and optionally send a further query wrapper including indications of the movie theatres where the movie entity is being shown.

In the example of FIG. 1, the Showtimes App 100 identifies movie theatres and then transmits the query wrapper 116. Therefore, the query wrapper 116 includes context objects 118-1, 118-2, 118-3, and 118-4 for the movie entity and three movie theatre entities, respectively. Corresponding to the context objects 118 are query objects 120-1, 120-2, 120-3, and 120-4, respectively. In addition, the query wrapper 116 may have context information from the device, such as operating system version, geolocation, etc.

The query object 120-1 for the movie entity specifies a function/action of Movie_Reviews. Although shown as a human-readable string, the query object 120-1 may simply be a numerical value dictated by the search engine 120 and provided to the Showtimes App 100. The context objects 118-2, 118-3, and 118-4 correspond to fictional theatres "MCA Plaza 20," "JRM Townplace 16," and "Brookline Cineplex," respectively. The query objects 120-2, 120-3, and 120-4 for the movie theatre entities each include a pair of actions: tickets and directions.

As described in more detail below, the search engine 120 identifies which actions from the query objects are available for their corresponding context objects. Advertisement objects 124 are provided back to the Showtimes App 100.

In state 100-2 of the Showtimes App 100, corresponding to reference numeral 104-2 of the smartphone 104, user interface elements are displayed based on the advertisement objects 124. Because the search engine 120 determined that a Movie_Reviews action was available for "The Hobbit XIII," a reviews button 128 is displayed. The reviews button 128 may be labeled with an icon or a logo of the supplier of a developer portal or an operator of the search engine 120. For example only, a stylized "Q" may be displayed, which is associated with Quixey, Inc., of Mountain View, Calif.

Because the search engine 120 determines that a directions action was available for each of the movie theatre entities, directions buttons 130-1, 130-2, and 130-3 (the final button of which may be visible by scrolling the display) allow the user to obtain directions to the movie theatre.

Meanwhile, tickets actions are indicated by buttons 132-1 and 132-3. A tickets button 132-2 or "JRM Townplace 16" is omitted because the search engine 120 was not able to identify any advertiser apps that could perform the action (buy tickets) for the entity ("JRM Townplace 16").

In various implementations, the action query may provide multiple entities along with the "tickets" function designation: for example, "The Hobbit XIII" and "MCA Plaza 20." With both entities, the search engine 120 can indicate whether an action is available that allows tickets to be purchased for "MCA Plaza 20" for the specific movie "The Hobbit XIII." This may require the search engine 120 to identify search functions that have two parameters: a movie name and a movie theatre name.

The button 132-2 for the unavailable result may be completely invisible or may be shown with an outline, as drawn in FIG. 1. In other implementations, the button 132-2 may be shown grayed out—that is, the shade of the text is lightened, and any visual feedback upon selection (such as an animation of the button being pressed) is stopped. When the button 132-2 is invisible, the layout of the results may change. For example, the directions button 130-2 may move up to take the place of the button 132-2.

Figure 2A:
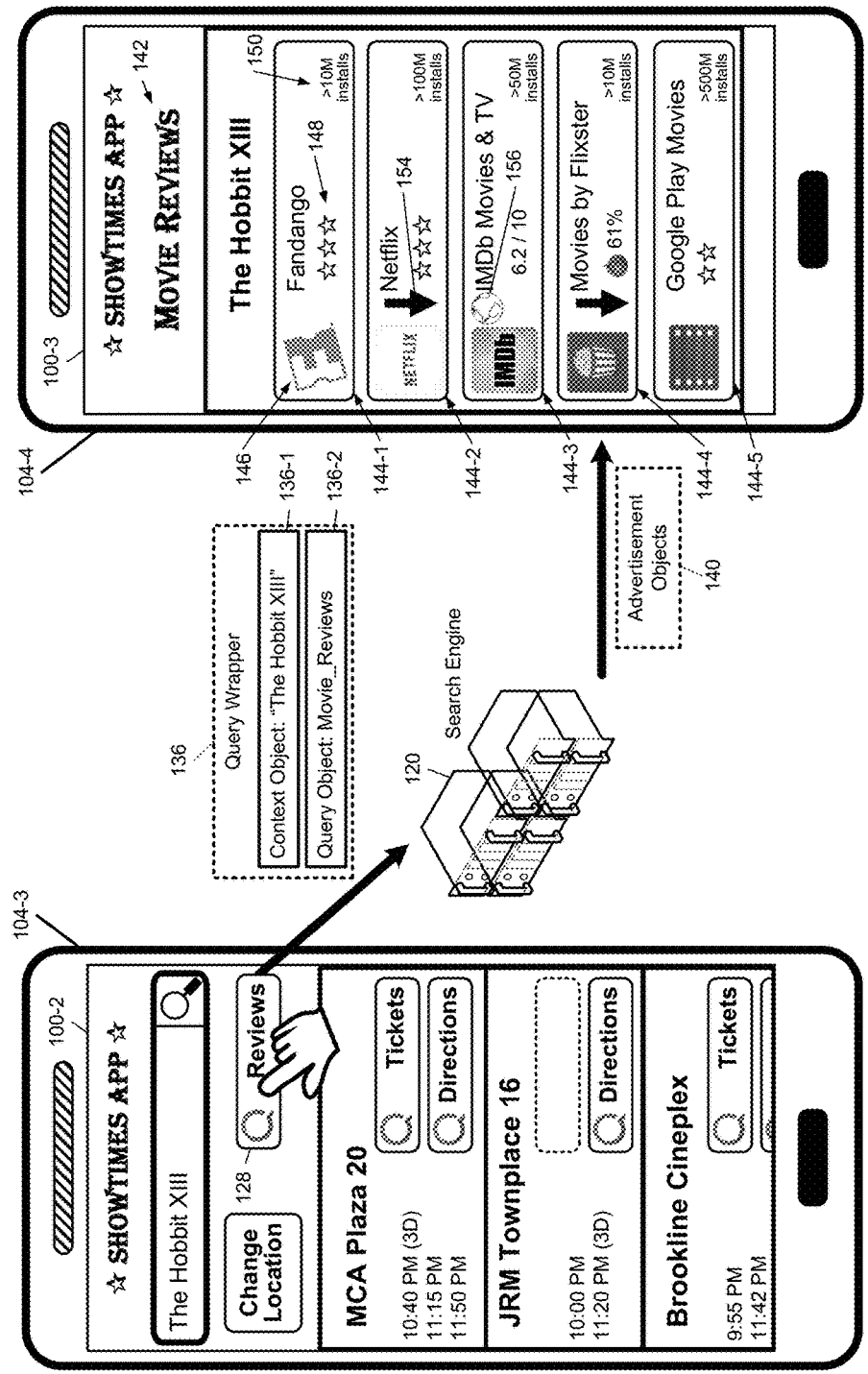
FIGS. 2A and 2B are simplified functional block diagrams with graphical user interface examples consistent with FIG. 1.

In FIG. 2A, if the user selects the reviews button 128, advertisements of apps that can provide reviews of "The Hobbit XIII" are displayed, either in the Showtimes App 100 or in some external application. As shown in FIG. 2A, a query wrapper 136 is sent to the search engine 120. The query wrapper 136 includes a context object for "The Hobbit XIII" and a query object of Movie_Reviews 136-2.

The query wrapper 136 may include other context information, including device data such as geo-location data of the device. Other context information includes time data—for example, search results may vary based on whether the specified time is now or is at the planned time of the dinner, movie reservation, etc. A search for a movie around the current location of the phone will not be as useful as the movie times around where the user's phone is expected to be after dinner.

In response to the query wrapper 136, the search engine 120 doesn't just identify whether there are application states that perform the specified action for the specified entity, but actually provides information, including deep links, about those application states in advertisement objects 140.

In other words, the advertisement objects 124 that were returned to the showtimes app 100 in FIG. 1 simply indicate which actions are available from advertisers. This approach may be taken because gathering deep links is time-intensive. Therefore, the search engine 120 gathers deep links after sending the advertisement objects 124 and can respond immediately upon receiving the query wrapper 136 with the gathered deep links and related state info, such as images and text.

For example, the advertisement objects 140 may be presented as deep view cards (DVCs). A DVC for an app or a state of an app shows additional information, not just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment. Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances, the DVC itself may provide the necessary information to accomplish such action.

A graphical presentation of the advertisement objects 140 is displayed in a state 100-3 of the Showtimes App 100, and the corresponding reference numeral for the smartphone 104 is 104-4. The advertisement objects 140 may include text and images for creation of DVCs along with layout rules or code to construct graphical results from the text and images.

The graphical results may be displayed in a portion of the Showtimes App 100, and the graphical results may appear to hover (not shown) over native content of the Showtimes App 100, such as by restricting the graphical results to a portion of the Showtimes App 100, leaving a border of native content of the Showtimes App 100.

In addition, the graphical results may be shown on a semi-transparent background so that the native content of the Showtimes App 100 (movie showtimes) remains at least faintly visible. In various implementations, the graphical results may slide in from one side or from the top or bottom, suggesting to the user that the results can be dismissed by swiping in an opposite direction.

The graphical results may be presented under a header 142 indicating the selected action. In this example, each of the results corresponds to movie reviews of the entity "The Hobbit XIII." A first result 144-1 corresponds to a FANDANGO app. Associated with the first result 144-1 is an icon 146, a rating 148 for "The Hobbit XIII" according to the Fandango app, and a metric 150, such as the number of installs of the Fandango app.

When the user clicks within the rounded rectangle surrounding the Fandango application 144-1, a library within the Showtimes App 100 will transition to the "Fandango" application and specifically to a state showing movie reviews for "The Hobbit XIII." The mechanism to reach this specific state is called an access mechanism.

Examples of access mechanisms can include, but are not limited to, app access mechanisms, web access mechanisms, app download access mechanisms, and scripts. An app access mechanism may be a string that includes a reference to a native app and indicates one or more parameters or operations that the user device 104 uses to access the referenced state. An app resource identifier (ARI) is an example app access mechanism.

A web access mechanism may be a string that includes a reference to a web app edition of a software product and indicates one or more parameters and/or operations for a web browser to execute. A web access mechanism may be a resource identifier that includes a reference to a web resource (e.g., a page of a web app/website). For example, a web access mechanism may refer to a uniform resource locator (URL) used with hypertext transfer protocol (HTTP). If a user selects a user selectable link including a web access mechanism, the user device 104 may launch a web browser app and may pass the resource identifier to the web browser. The web browser can utilize the resource identifier to retrieve the web resource indicated in the resource identifier and/or access a function of the software app indicated by the resource identifier.

An app download access mechanism may indicate a location (e.g., a digital distribution platform) where a native app can be downloaded in the scenario where a native app edition of the app is not installed on the user device 104. If a user selects a user selectable link including an app download access mechanism, the user device 104 may access a digital distribution platform from which the referenced native app edition may be downloaded. The user may opt to download the native app edition. Upon doing so, the user device 104 may launch the native app edition and may access the state of the software app using the native app edition and an app access mechanism associated with the user selectable link.

A script is a set of instructions that, when executed by the user device 104, causes the user device to access a resource indicated by the script. For example, the script may instruct an operating system of the user device 104 to launch the native app and may define one or more additional instructions (such as user interface injection actions) to access a particular state of the app. Scripts may be used when an edition of a software app is not configured to allow direct access to states by other mechanisms.

A second result 144-2 is for a NETFLIX app, which is not yet installed and therefore has an indication (in this case, an icon 154) that the application must first be downloaded and installed. Alternatively, an "(Installed)" parenthetical could be used with apps, such as Fandango, that are already installed on the smartphone 104.

Other text, such as "Open," may instead be used when the app is already installed. Apps not yet installed may be labeled with "Download" or "Install" labels. Equivalently, icons or other visual cues may distinguish between apps that can simply be opened (including native apps and, as described in more detail below, web apps) or that first need to be installed.

Selecting the Netflix application result may trigger the opening of a digital distribution platform in either a web browser or a dedicated app, such as the native Netflix app available from the Google PLAY STORE digital distribution platform. The identity of the app to be downloaded is provided to the digital distribution platform so that the user is immediately presented with the ability to download the desired app. In some implementations, the download may begin immediately, and the user may be given the choice of approving installation. Upon completion of installation, the library may automatically navigate to the desired state of the Netflix app—that is, the state for reviews of "The Hobbit XIII."

Other data shown for each result may include snippets of text (such as the first few words of a review), an image (such as a screenshot of the state), a reliability metric (such as number of user reviews), a freshness metric (such as most recent observed update to the state), etc.

In situations where non-sponsored app results are returned along with sponsored app results, the sponsored app results can be placed at the top of the list. Further, the sponsored app results can be highlighted in a way that is perceptible to the user, including increasing the font size, using different colors, adding a graphic or text sponsorship label, etc.

As described in more detail below, apps may also be accessed through intermediary software, such as a web browser. These apps, such as HTML5 apps, may be shown with an open action and may be identified as being a web-based app using an icon or text. For example, a globe icon is shown at 156 to indicate that result 144-3 for the IMDB MOVIES & TV app will be opened in a web browser. As another example, a text label (not shown) could be included, such as "Open In Browser" or "Open On The Web." Results 144-4 and 144-5 for a MOVIES BY FLIXSTER app and a GOOGLE PLAY MOVIES app, respectively, are also shown.

Figure 2B:
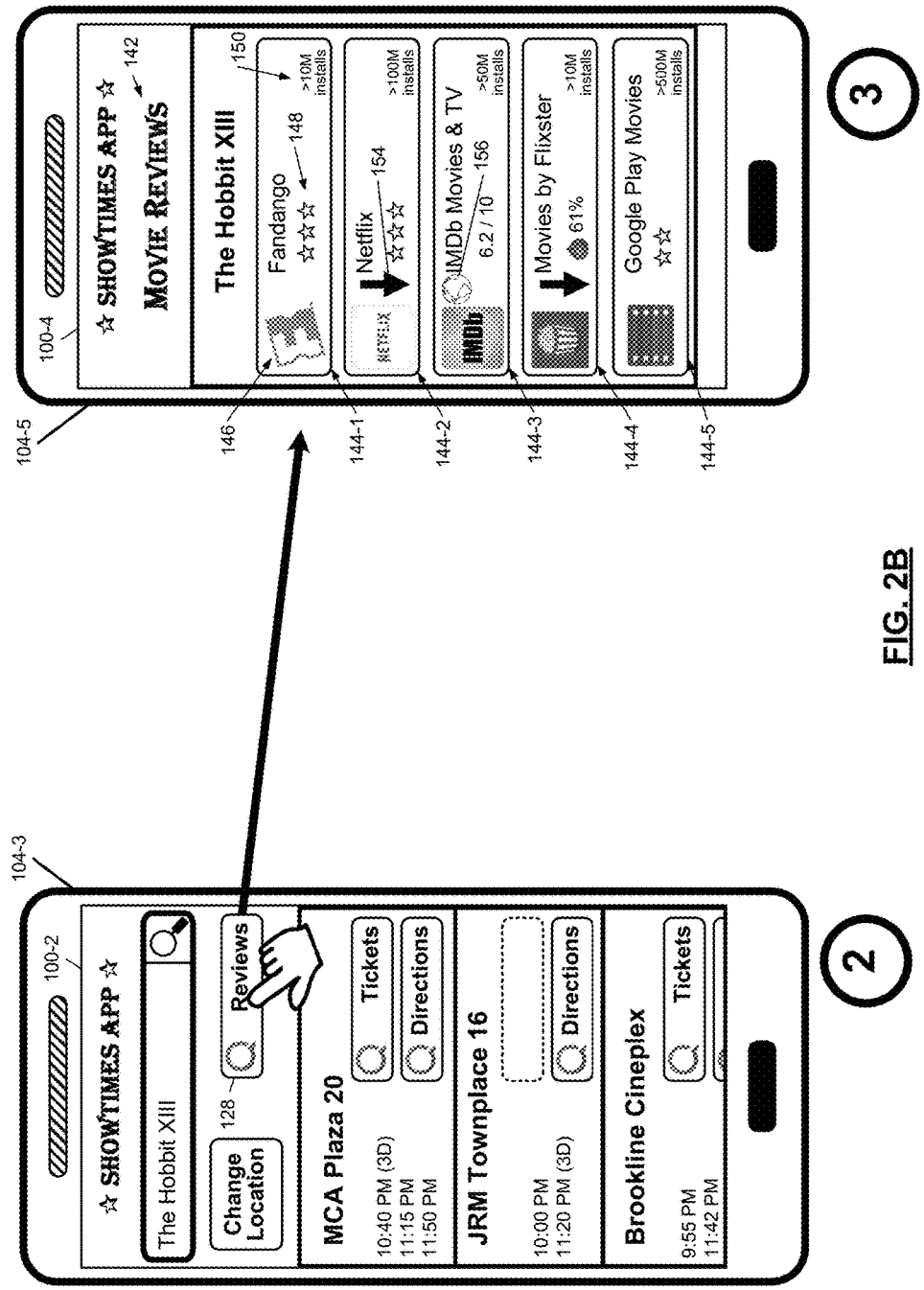

In FIG. 2B, selection of the reviews button 128 is shown, similarly to FIG. 2A. However, in FIG. 2B, the showtimes app 100 does not need to make another query to the search system 120. In other words, the advertisement objects 124 of FIG. 1 already included the information and deep links shown in the results 144.

Figure 3:
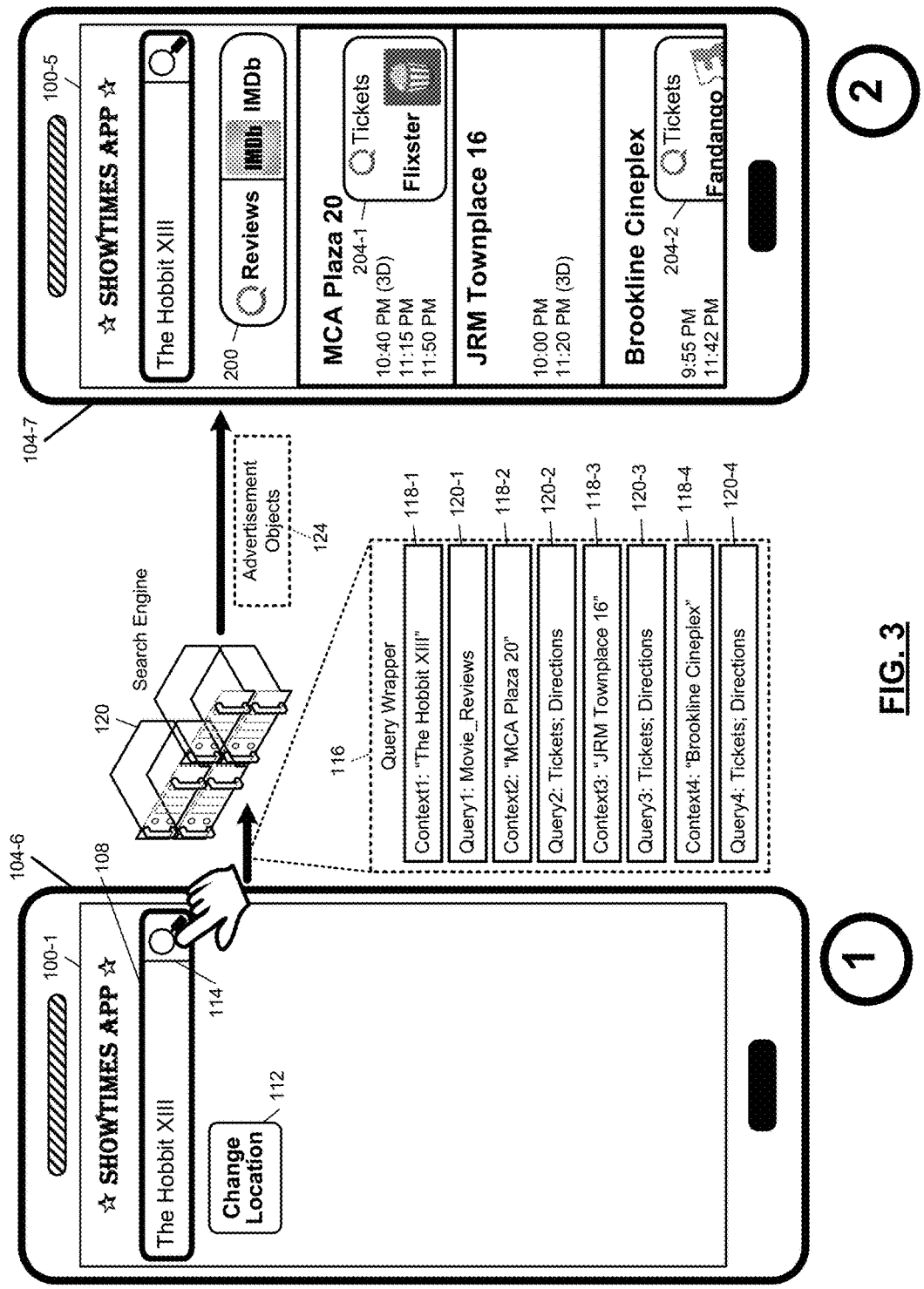
FIG. 3 is a simplified functional block diagram with an alternative graphical user interface example.

In FIG. 3, the state 100-1 of the showtimes app 100 is shown in user device 104-6. The query wrapper 116 and the advertisement objects 124 may be the same as in FIG. 1. The advertisement objects 124 in this example include deep links and images and data related to the results. A state 100-5 of the showtimes app 100 is shown in user device 104-7.

Buttons 200, 204-1, and 204-2 demonstrate co-branding, where the action and the indicator of the app to be opened are shown.

The button 200 shows an action of reviews along with an indication that the IMDb app will be opened to show reviews for the Hobbit XIII. The button 204-1 indicates that tickets will be purchased through the FLIXSTER app. Similarly, the button 204-2 indicates that tickets will be purchased through the FANDANGO app.

Figure 4:
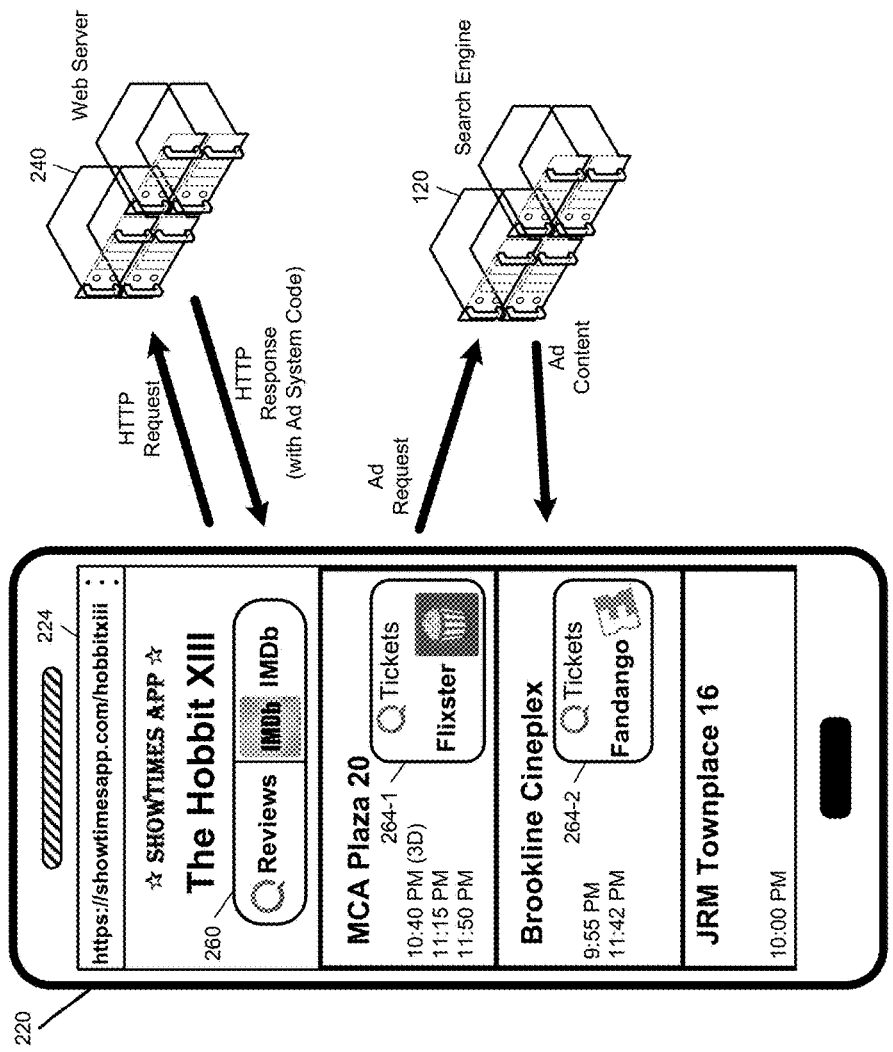
FIG. 4 is a simplified functional block diagram for a web edition of an app.

In FIG. 4, a user device 220 is shown running a browser with location bar 224. Based on the URL (Uniform Resource Locator) shown in the location bar 224, the browser makes an http (Hypertext Transfer Protocol) request to a web server 240. The web server 240 responds with an http response including ad system code for rendering results in querying the search system 120. The ad system code may be implemented as JavaScript instructions.

When executed by the browser, the ad system code transmits an ad request (which may be similar to the query wrapper 116 in FIG. 1) to the search system 120. The search system 120 responds to the browser with ad content, such as the advertisement objects 124. In various implementations, the web server 240 may transmit a hint (not shown) to the search system 120. This hint indicates to the search system 120 that an ad request will be arriving so that the search system 120 can begin performing a search for relevant content.

Based on the ad content from the search system 120, the web browser displays a button 260, which may be visually similar to the button 200 of FIG. 3. Similarly, buttons 264-1 and 264-2 may be visually similar to the buttons 204-1 and 204-2 of FIG. 3. In various implementations, such as is shown in FIG. 4, the developer of the showtimes app may sort results based on which results have corresponding advertisements. This may increase ad revenue for the developer of the showtimes app.

Overview

Figure 5:
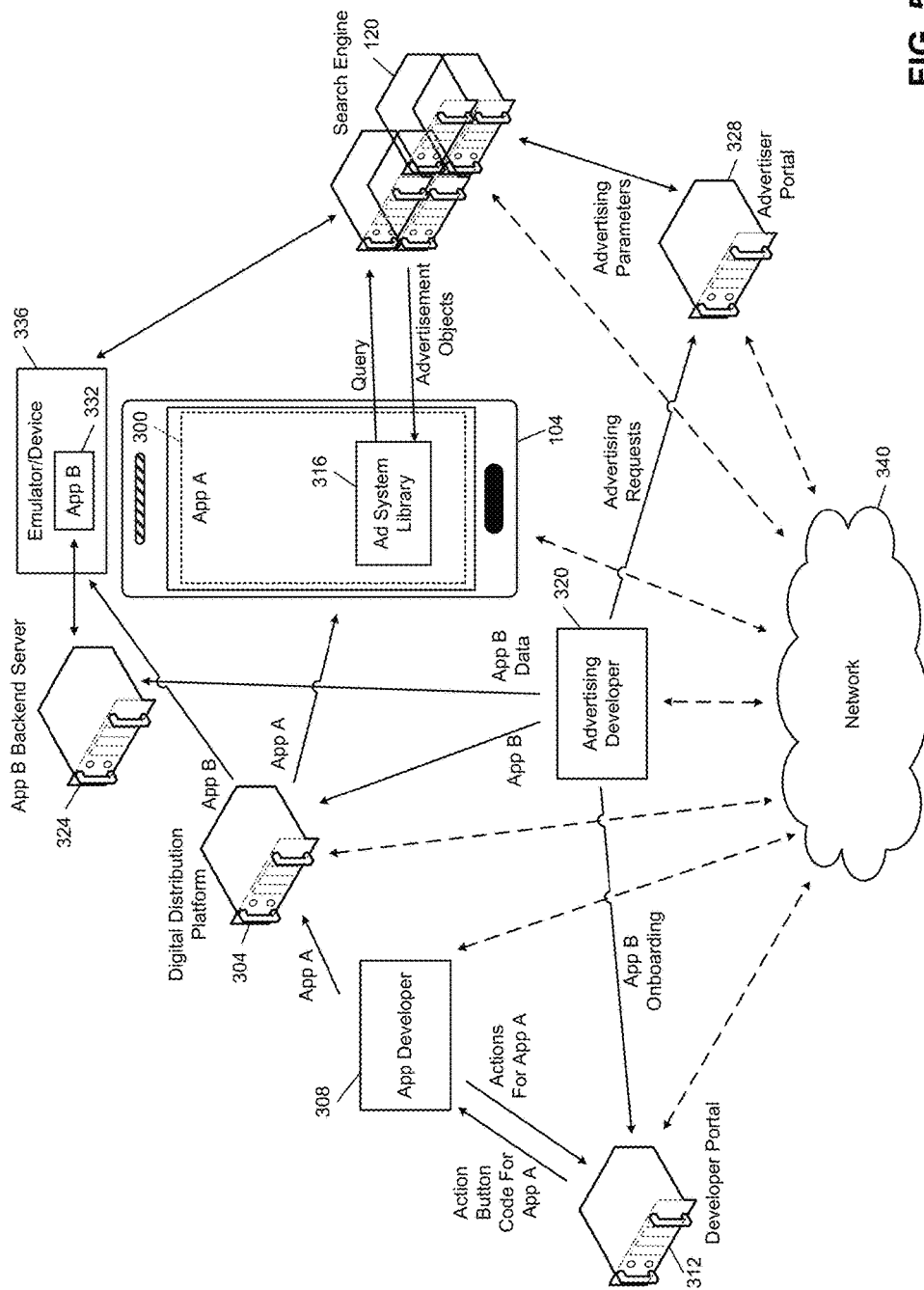
FIG. 5 is a high-level functional block diagram of various systems of the present disclosure.

In FIG. 5, the user device 104 is shown executing a copy 300 of an app called "app A," which may be the showtimes app 100 of FIGS. 1-3. The copy 300 of app A is obtained from a digital distribution platform 304, such as the GOOGLE PLAY digital distribution platform from Google, Inc. or the APP STORE digital distribution platform from Apple, Inc.

An app developer is graphically represented at 308 and develops and provides app A to the digital distribution platform. While developing app A, the app developer 308 interacts with a developer portal 312 to acquire an ad system library 316 for incorporation into app A. Based on actions that the app developer 308 believes are relevant to app A, the developer portal 312 provides code, which may be in the form of the ad system library 316, that can query the search engine 120 for specific apps that can perform that action. The ad system library 316 may also include code for rendering graphical representations of these apps and also code for traversing deep links related to the results.

An advertising developer 320 develops another app, called "app B" for simplicity. The advertising developer 320 provides app B to the digital distribution platform 304. The advertising developer 320 may also operate a backend server 324 for app B. The backend server 324 provides data to executing copies of app B. For example, if app B is the FANDANGO app, the backend server 324 may include information about movies, tickets, and prices, as well as code for purchasing movie tickets.

The advertising developer 320 establishes one or more advertising campaigns with an advertiser portal 328. The advertiser portal 328 allows the advertising developer 320 to specify which actions the advertising developer 320 wants to accommodate. The advertising developer 320 may also assist the search engine 120 to be able to access app B by engaging in an onboarding process for app B with the developer portal 312.

The onboarding process includes identifying search functionality of app B. Specifically, search input states where parameters can be provided and searches performed are identified. Onboarding determines a path to reach the search input state, using a sequence of user interface interactions, from a default (or, home) state of the app.

The parameters that are provided to the search input states are characterized. Further, the types of entities required for the parameters are determined. In this way, the search engine 120 can identify which search input states from which apps take as input parameters provided in a query.

In addition, onboarding may determine information about how to reach the search input state within the app as well as exactly how to enter parameters into the search input state. For example, each parameter may be associated with one or more user interface widgets in the search input state. For each parameter, the onboarding process may identify a sequence of user interface events to enter or change the parameter. Once app B is onboarded, the search engine 120 selectively executes a copy 332 of app B within an emulator/device 336.

Although shown as a single element, the emulator/device 336 may be part of a set of emulation servers that offer multiple hardware devices or emulated devices for executing apps on behalf of the search engine 120. Under the control of the search engine 120, the emulator/device 336 can navigate to a search input state of the copy 332 of app B, enter parameters, perform a search, and send a scrape of the search results back to the search engine 120.

As shown in FIG. 5, the copy 332 of app B may rely on data from the backend server 324. The ad system library 316 may be invoked by one or more states of app A that have advertisement elements (such as buttons). The ad system library 316 sends a query (such as the query wrapper 116 in FIG. 1) to the search engine 120. The search engine 120 responds to the ad system library 316 with advertisement objects (which may be the same as the advertisement objects 124 of FIG. 1).

While the data flow in FIG. 5 is shown with solid lines, the various devices and systems in FIG. 5 may actually communicate with each other via network 340. The network 340 may include wired and wireless local area networks, mobile phone networks, personal area networks, and wide area networks such as the Internet.

Search Engine

Figure 6:
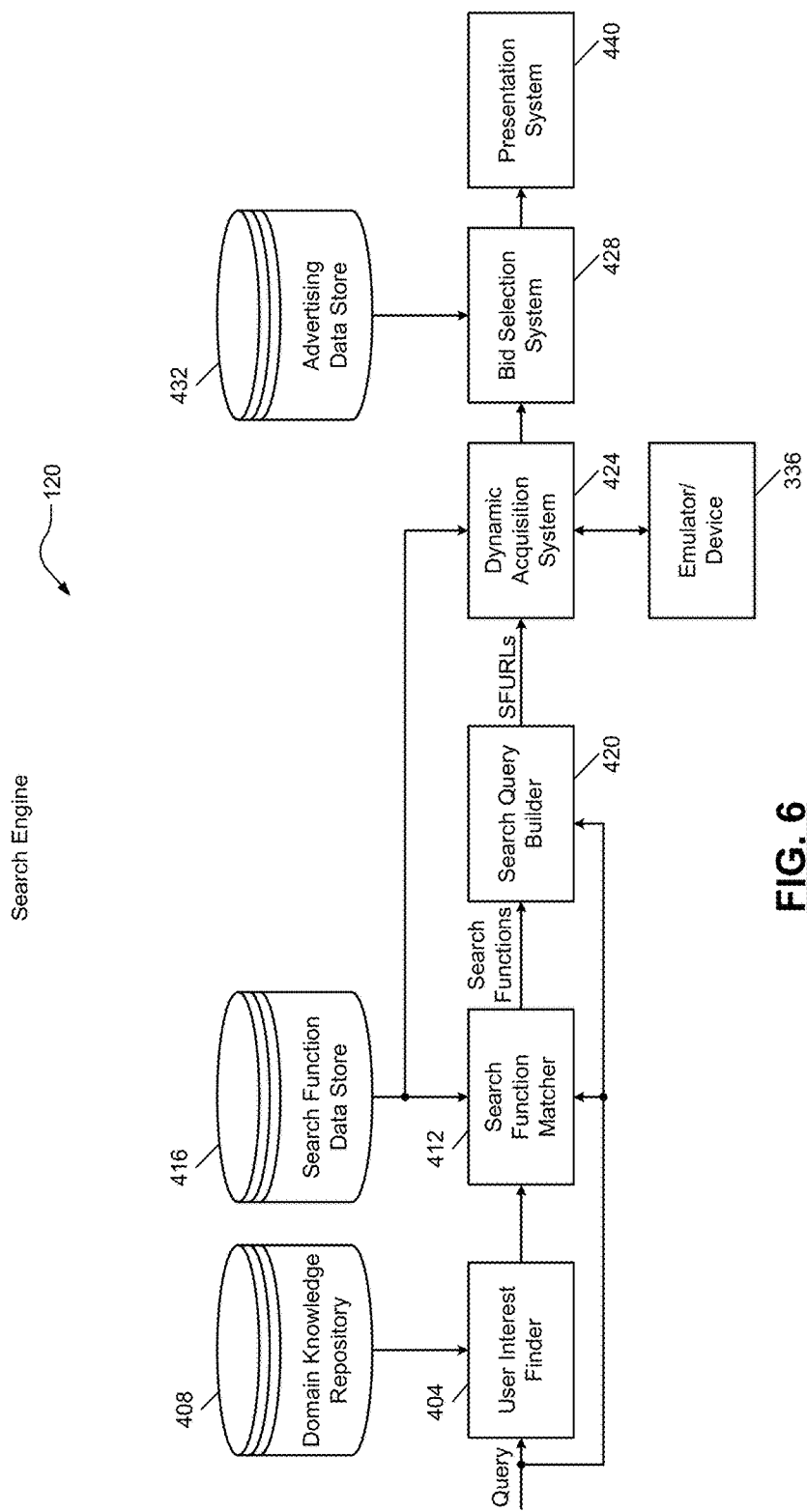
FIG. 6 is a functional block diagram with an example implementation of a search engine.

In FIG. 6, a functional block diagram of an example implementation of the search engine 120 includes a user interest finder 404 that attempts to recognize what entity types have been provided in a user query. This entity type detection may be based on a domain knowledge repository 408. Multiple different interpretations of the query may be output by the user interest finder 404. For example only, a certain string may be a movie name as well as the name of a video game. The most likely interpretations are provided to a search function matcher 412.

As a simple example, the domain knowledge repository 408 may have text data about a variety of industry verticals. For example, the domain knowledge repository 408 may have lists of restaurant names, lists of movie names, lists of actor names, lists of video games, lists of states and provinces, etc. Strings can be matched against the lists in the domain knowledge repository 408 to infer what type of entity the string refers to. Entity type detection is described in more detail in commonly-assigned U.S. Prov. App. No. 62/220,737 filed Sep. 18, 2015, titled "Entity-Type Search System," with first-named inventor Sudhir Mohan, the entire disclosure of which is incorporated by reference.

The search function matcher 412 selects search functions from a search function data store 416 that have input parameters matching the parameters recognized by the user interest finder 404. The search function data store 416 is populated for each app using an onboarding process. During the onboarding process, configurators (which may include human operators and/or automated algorithms) identify what searches can be performed in an app and what types of entity data is specified in each search.

The set of relevant search functions is provided to a search query builder 420. The search query builder 420 combines the generic search function with specific values from the query. The resulting populated search functions may be referred to as Search Function Uniform Resource Locators (SFURLs). For illustration only, an example SFURL is presented here:
func://googleplay/android/com.ted.android/39/
    VXhV_hNM?p0=wearing%20nothing%20new As shown, a Search Function URL (SFURL) may encode a name ("googleplay") of the digital distribution platform from which the app was obtained, since different digital distribution platforms may have different versions of an app. The SFURL may also have an indicator ("googleplay") of the operating system for the app, a name ("com.ted.android") of the app, a version ("39") of the app, and an identifier ("VXhV_hNM") of the specific search function. The SFURL may also include a serialized sequence of parameters to provide to the search function. A first parameter may be named p0 and have a value of "wearing nothing new."

The search function data store 416 stores a guide for each SFURL indicating how to traverse the app from the home (or, default) state to the search input state where the search is performed. This guide may be a series of user interface (UI) interactions. The identifier in the SFURL may, in some implementations, be a hash of this guide.

The search function data store 416 may also store guide data for each input (also called a parameter) for the search. In other words, the guide dictates how a value can be supplied for a parameter within the search input state. For example, this may include an identification of a UI element corresponding to that parameter, and what UI action to perform in order to control that parameter.

Because apps cannot always be launched to a specific state simply with a URL or other URI (Uniform Resource Identifier), the search system of the present application may navigate to a desired state with a combination of intent calls and user interface (UI) injection. The term "intent" is generally associated with the ANDROID operating system, but is used in this disclosure simply to refer to a programmatic approach to reaching a specific state. Corresponding elements for the IOS operating system may be referred to as view controllers.

UI replay may be used to simulate a user tapping or making other gestures in an app as well as for supplying data, such as text normally entered by a user through a soft keyboard. In various implementations, UI replay may be accomplished using an accessibility framework provided by the operating system or by a search-enabled app. Some states may be reached by a combination of intent invocation and UI replay. For example, an intent may be invoked to arrive at a search state and then UI replay simulates a user typing text and clicking a search button.

A dynamic acquisition system 424 accesses data requested by the SFURLs. For example, the dynamic acquisition system 424 may access native apps running in emulators or devices, such as the emulator/device 336. The dynamic acquisition system 424 may also access web editions of an app using a live web scraping system. When using a native app, the dynamic acquisition system 424 may rely on search guides from the search function data store 416 to navigate to the appropriate state and supply the parameters to the app within the emulator/device 336.

Results from the native search system 424 are received by a bid selection system 428. The bid selection system 428 calculates bid prices based on rules stored in an advertising data store 432. The advertising data store 432 may be populated based on advertiser interactions with the advertiser portal 328. As described above, results from the native search system 424 that do not correspond to active campaigns may be assigned a bid value of zero.

One of the bids is selected, which, in various implementations, is the highest bid. In other implementations, such as that demonstrated in FIG. 2A and FIG. 2B, multiple bids may be selected and prepared as advertisement objects for the user. When no non-zero bids are present, one or more of the zero bids may be transmitted to the user so that the user is presented with maximum functionality.

A presentation system 440 prepares an advertisement object with the deep link and associated information for the selected bid or bids. The presentation system 440 may parse and format results obtained by the dynamic acquisition system 424. The presentation system 440 then provides results to the user device that transmitted the query. For example, the presentation system 440 may format some results to fit a screen of the user device. For other results, such as from predetermined apps, the presentation system 440 may remove, transpose, or otherwise modify specific data from results.

Figure 7:
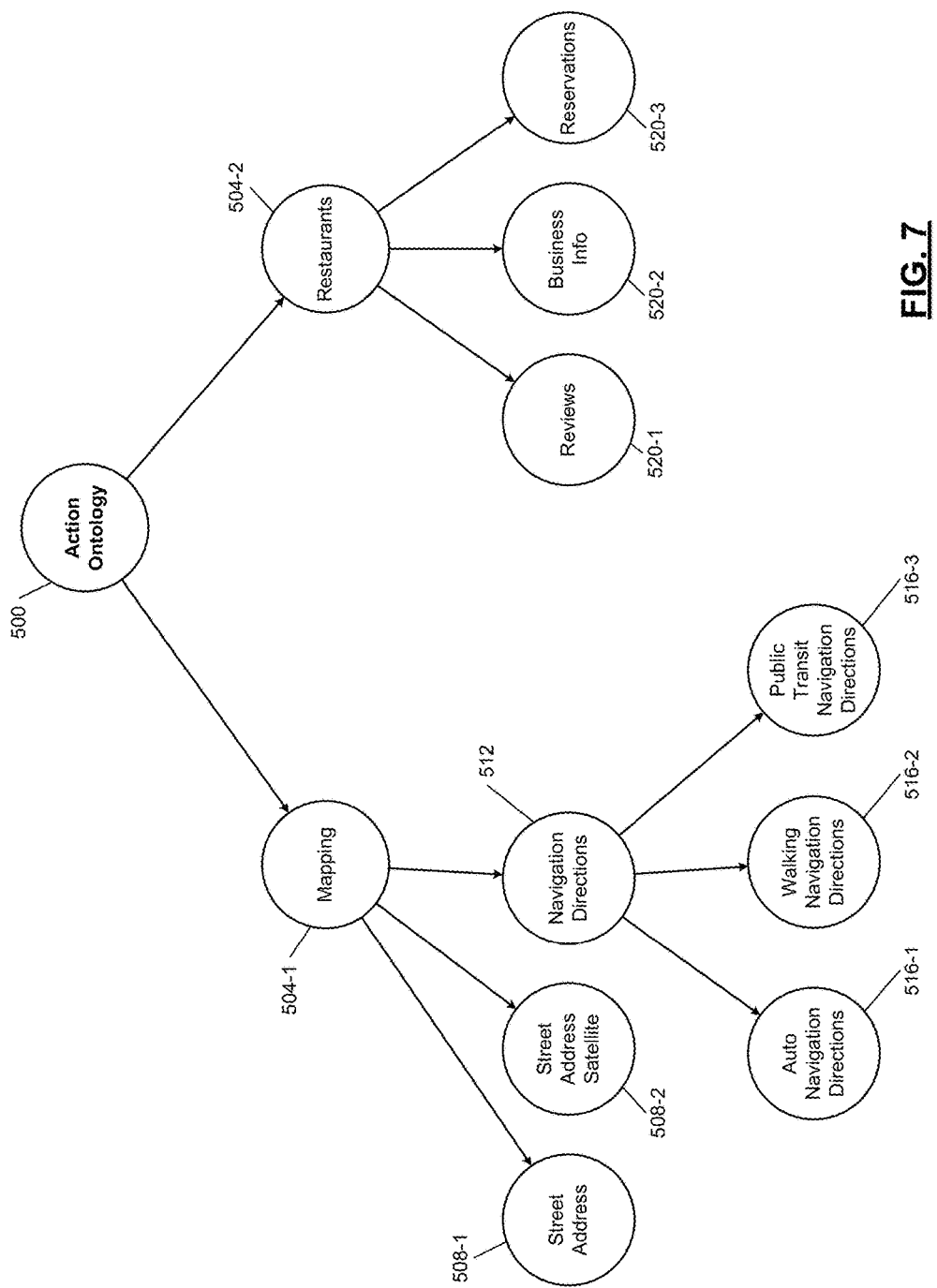
FIG. 7 is a graphical representation of a subset of an action ontology.

In FIG. 7, an action ontology 500 developed by an operator of the search system includes a number of branch nodes (such as mapping 504-1 and restaurants 504-2), which may represent different industry verticals. The function ontology 500 includes leaf nodes such as street address mapping 508-1 and street address with satellite imagery 508-2 underneath the mapping branch node 504-1. Each of the leaf nodes corresponds to a particular function offered by one or more apps.

Although a hierarchical tree structure is shown and is described as an ontology, classifying the functions of apps is not limited to ontologies or to tree structures. For example, a function classification may simply include a flat list of functions, which may or may not have interrelations. The interrelations may form a directed or undirected graph that does not conform to a tree structure.

A navigation directions branch node 512 underneath the mapping branch node 504-1 encompasses leaf nodes for auto navigation directions 516-1, walking navigation directions 516-2, and public transit navigation directions 516-3. The function ontology 500 also includes leaf nodes for reviews 520-1, business information 520-2, and reservations 520-3 underneath the restaurants branch node 504-2.

The function ontology 500 may be arranged in a wide variety of ways and may be divided at varying levels of granularity. For example, the leaf nodes 508-1 and 508-2 may be combined under a common street address branch node, where leaf node 508-1 would simply specify no satellite imagery while leaf node 508-2 would specify the presence of satellite imagery.

Decisions on how to structure the function ontology 500 may be made by operators of the search system based on, for example, how many apps perform each function. If a leaf node exists that specifies a function only performed by one app, that leaf node may be combined with other leaf nodes so that a selection of applications is available.

When a consuming developer specifies a function of interest for their app, the function may be specified as a leaf node corresponding to a specific function or as a branch node corresponding to a variety of functions. For example, the consuming developer may specify mapping (branch node 504-1) as the desired function if the specific mapping function provided by the function module is not important. However, if the consuming developer requires that public transit be encompassed by the function module, the consuming developer would specify the leaf node 516-3 for public transit navigation directions.

Developer Portal User Interface

Figure 8:
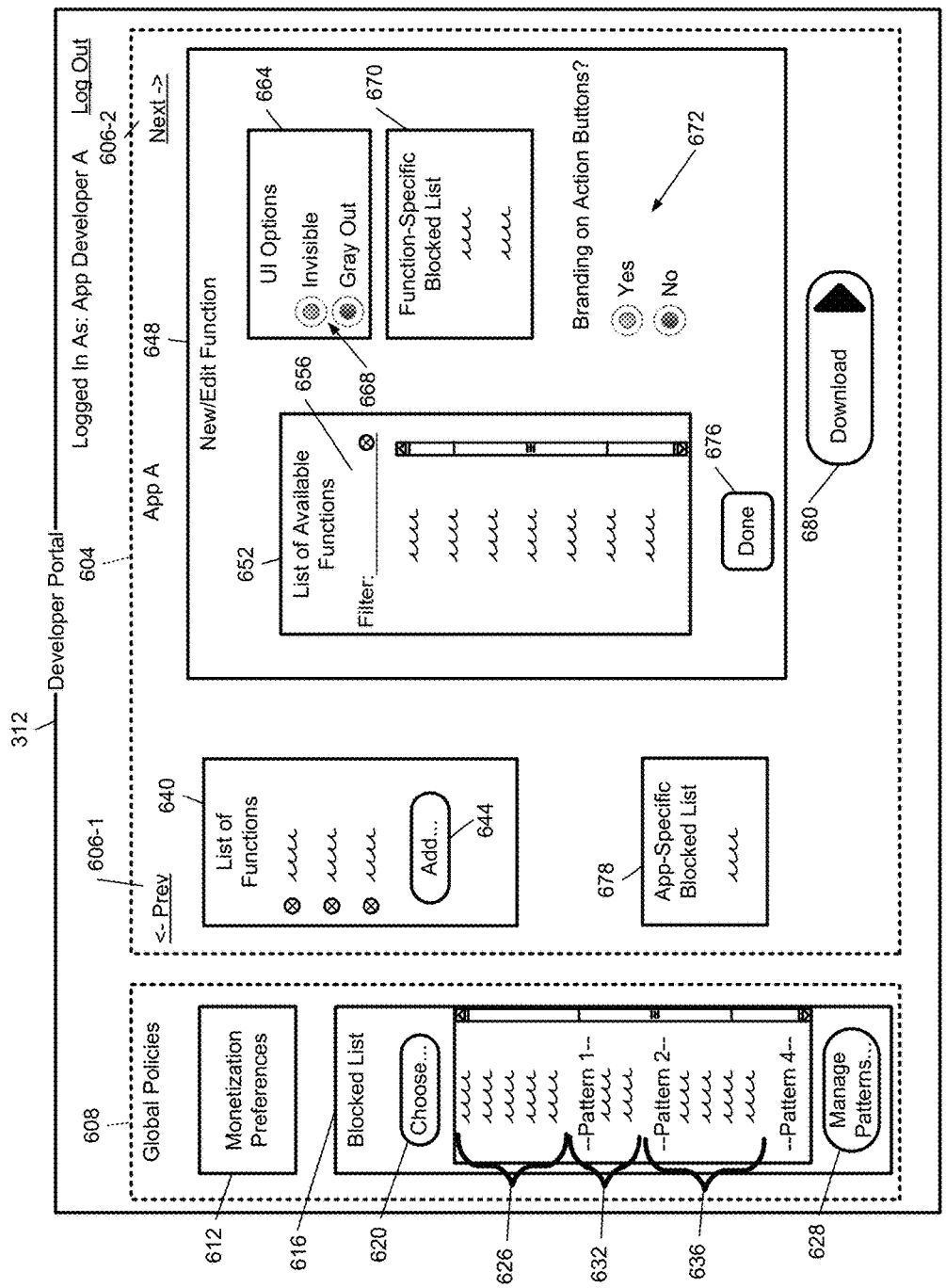
FIG. 8 is an example graphical user interface for a developer portal.

In FIG. 8, a simplified user interface for an example implementation of the developer portal 312 is shown. The app developer (referred to as App Developer A) logs into the developer portal 304, which may be a website. Because of the sensitivity of app and monetization information, a two-factor authentication protocol may be required for app developers.

App Developer A creates one or more app profiles in the developer portal 312. Settings and data related to App A are shown at 604, and the app developer 308 may be able to cycle through other apps using "Previous" and "Next" user interface elements 606-1 and 606-2. Global policies are shown at 608 and include monetization preferences 612 and a blocked list interface 616 that apply to all of the developer's apps.

The monetization preferences 612 may include payment details for App Developer A, including how the developer portal 312 can pay App Developer A for sponsored links being shown in the apps associated with App Developer A. For example only, the monetization preferences 612 may include billing addresses and account information for digital funds processing systems such as the PAYPAL payment platform. In implementations where use of the developer portal 312 is not free, the monetization preferences 612 may also include options for beginning or ending service, and options for changing the payment schedule (for example, from monthly to annually).

The blocked list interface 616 includes a list of apps, app states, and/or entities that App Developer A does not want to have displayed in any of the apps for App Developer A. A "Choose" button 620 allows App Developer A to choose, from a list, which apps should be blocked. This list (not shown) may be searched, filtered, etc. Explicitly chosen apps for a blacklist are shown at 626. In addition, a "Manage Patterns" button 628 may allow App Developer A to specify wildcard patterns that match apps not to be presented to users of App Developer A's apps.

For example, if App Developer A works for SAM'S CLUB WAREHOUSE CENTERS discount retailer, one specified pattern may correspond to the competitor COSTCO discount retailer. The Costco pattern may include wildcards before and after "Costco" so that any Costco app is identified. Blocked lists and blacklists are further described in U.S. patent application Ser. No. 14/923,226, filed Oct. 26, 2015, titled "Dynamic Availability-Based Integration of External Functionality," with first-named inventor Jonathan Ben-Tzur, the entire disclosure of which is incorporated by reference.

In the app specific settings 604, a list of functions 640 identifies what external functionality will be available to App A. For example, the listed functions within 640 may correspond to finding food, finding driving directions, and finding movie reviews. An "Add" button 644 allows a new function to be specified using a new/edit function interface 648. A list of available functions 652 may include functions of interest identified by the developer portal 312 for various verticals, such as movies, dining, travel, sports, etc. A filter interface 656 allows the available functions to be filtered, such as by name, for easier identification of the desired function.

The available functions 652 are the leaf nodes of the function ontology (such as the function ontology 500 of FIG. 7). While shown as a list, the available functions 652 may be presented in a hierarchical outline format, or in a tree format (such as is shown in FIG. 7). Sub-branches may collapse into a branch node (that is, disappear from view) until selection so that a full ontology can be displayed on a single viewing screen.

A user interface options portion 664 allows App Developer A to specify how results for the selected function should be displayed. The options may include specifying how many results are to be shown, what associated information (such as starred ratings) should be shown, and how the button corresponding to the function should be displayed.

As one example, App Developer A may specify how many sponsored apps or entities should be shown in a results set. In another example, App Developer A may be able to specify that only already-installed apps should be shown to the user. App Developer A may also specify, such as by using CSS (Cascading Style Sheets), the graphical presentation of search results.

For example, in the user interface options portion 664, App Developer A may specify a particular shape and size for a button, and may identify whether logos or text identifying the developer portal 312 (such as a logo of a provider of the developer portal 312) should be shown on the button. App Developer A may be able to specify in the user interface options portion 664 that App Developer A will create the button or other user interface element, and therefore, the user interface element does not need to be provided by the developer portal 312. Instead, the developer portal 312 can provide the code for searching for the function, which will be called by whatever user interface element App Developer A creates.

The user interface options portion 664 may also include settings used to adapt user interface elements when the corresponding action is not available. For example, settings 668 may allow user interface elements to be hidden or grayed out when the corresponding action is unavailable.

A function-specific blocked list 670 allows App Developer A to block apps and/or states specifically per function. For example, App Developer A may believe that a particular popular app does not provide a good user experience for the particular function at issue. This app can therefore be added to the function-specific blocked list 670.

A set of radio buttons 672 allows App Developer A to choose whether the highest-bidding app for the action should be indicated on the button, such as by displaying in icon or name of the app that will handle the action. In some implementations, the developer may not be given control over whether the search system is identified (such as with the stylized Q of Quixey, Inc.) to ensure brand recognition for the search system.

When a function has been specified and/or edited, a "Done" button 676 can be actuated by App Developer A. An app-specific blocked list 678 allows App Developer A to block apps and/or states for all functions specified for App A. For example, App Developer A may develop apps for a number of small companies. Each app may therefore correspond to a different company. Each company may have their own list of competitors that may be added to the app-specific blocked list 678.

A "Download" button 680 allows App Developer A to obtain the code necessary to access the specified functions in the list of functions 640. As discussed above, a customized library may be downloaded in response to the "Download" button 680. Alternatively, a predetermined library may be downloaded that forms query wrappers and presents search results. This SDK library may be accessed using an API; API calls crafted according to the list of functions 640 may be downloaded for use in the programming environment of App Developer A.

The "Download" button 680 may also allow a software development kit (SDK) to be downloaded. The SDK may integrate with the programming environment of App Developer A, such as an integrated development environment. The SDK may duplicate or replace the developer portal 312 for specifying some of the options. The SDK may provide for one-click addition of a specified function to a template or layout that App Developer A is creating.

With that single click, the SDK may place a user interface element, such as a button, into a graphical form editor. The SDK may also create an appropriate API call to the SDK library that can send a query wrapper and receive app results. The SDK may also populate an entire new screen (state) of the application with graphical elements used for displaying app results. In other implementations, the SDK may insert API calls that will allow App Developer A to query the results returned and format and display the results in whatever manner App Developer A chooses.

The settings specified in the developer portal 312 may be reflected in the parameters of the API calls, the downloaded code, a custom SDK library, etc., provided by the developer portal 312. This code may then be integrated into App A, and the code integrated into App A is solely responsible for providing relevant information to the search engine 120. Alternatively, some data may be communicated by the developer portal 312 to the search engine 120. For example, the global policies 608 may be provided to the search engine 120. Then, whenever an app corresponding to App Developer A queries the search engine 120, the search engine 120 is aware of, and operates according to, the global policies 608 set by App Developer A.

App-specific policies may also be communicated to the search engine 120. That way, when the search engine 120 receives a query from App A, the search engine 120 is aware of some or all of the parameters specified in the developer portal 312 for App A. App Developer A may make changes in the developer portal 312 subsequent to distributing App A. These changes may be sent to the search engine 120 to allow for the behavior of external functionality buttons to be adapted over time without having to create a new version of App A in the digital distribution platform 304.

In some implementations, some parameters may never be communicated to the search engine 120. For example, certain blocked apps may be filtered out from received results within App A itself as opposed to being filtered out by the search engine 120. This filtering may be performed by code provided by the developer portal 312 and customized by, for example, the blocked list 616. Alternatively, the developer portal 312 may provide instructions to App Developer A on how to perform the filtering using appropriate API calls to functions or libraries provided by the developer portal 312.

Advertiser Portal User Interface

Figure 9:
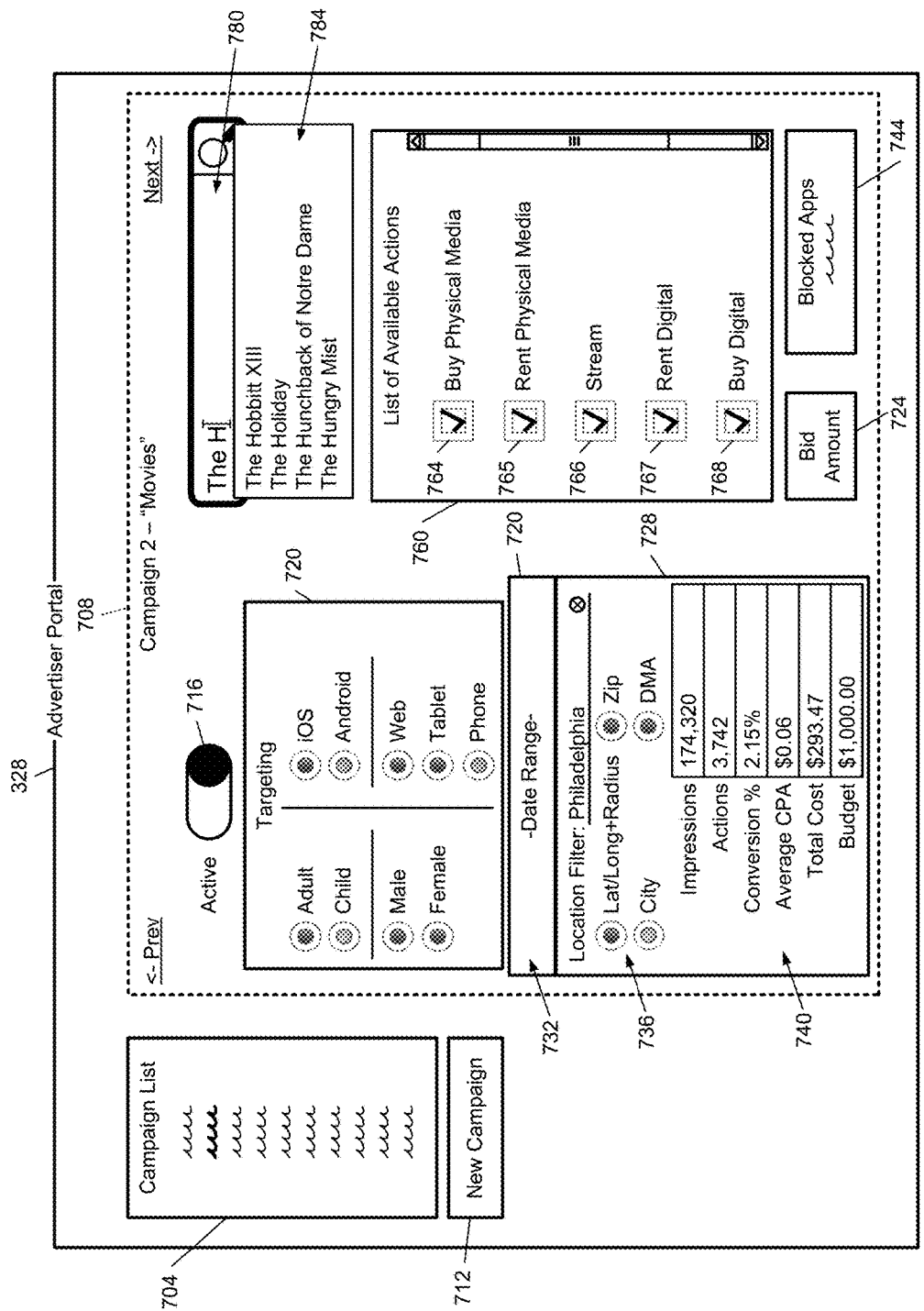
FIG. 9 is an example graphical user interface for an advertiser portal.

In FIG. 9, an example user interface for an implementation of the advertiser portal 328 includes a campaign list 704 for the advertiser presently logged into the advertiser portal 328. In the campaign list 704, the second campaign may presently be selected in an edit window 708. A new campaign can be created using a button 712. Within the edit window 708, a slider 716 sets whether the present campaign is active or not.

Targeting parameters 720 may allow for ads to be targeted based on, for example, demographic data related to age or gender. In addition, the operating system and device of the audience may be targeted. Although not shown, the advertiser may specify how one of the targeting parameters affects bid price.

In bid amount 724, the advertiser can set a bid price. The advertiser or the advertiser portal 328 may specify whether bids are based on impressions, actions, conversion rate, etc. For example only, the bid amount 724 may be per time that a button associated with the advertiser is displayed to a user. In another example, the bid amount 724 may be per instance of the user clicking on a button associated with the advertiser's campaign.

Information about historical performance of the campaign is shown at 728. A date range 732 may be specified to limit the time period in which statistics are displayed. A location filter 736 may allow for statistics to be shown for certain areas. For example only, the location may be specified by city, zip code, latitude and longitude with a specified surrounding radius, or designated market area (DMA). Statistics 740 are then displayed and may include a number of impressions (such as where the button of the developer is displayed or when the developer's app is displayed as part of a list of possible actions), actions (in which the app is actually selected to perform the action), a conversion percentage based on actions divided by impressions, average cost per action, total cost of the campaign, and budget.

For example only, the budget may be set by the advertiser as a cap, after which the advertiser portal 328 may assign a bid value of zero to this campaign and/or deactivate the campaign. A blocked apps interface 744 allows the advertiser to specify apps in which this campaign should not be shown. For example, this may include apps that the advertiser considers counter to their corporate values or apps for which they know users will generally not be a good audience for the advertiser.

A list 760 of available actions can be selected by the advertiser for the present campaign. As examples only, the following actions are shown and selected: buy physical media 764, rent physical media 765, stream 766, rent digital 767, and buy digital 768. For example only, these actions may be selected from the function ontology 500 of FIG. 7. Instead of the list 760, a tree view may be shown, where branch nodes can be selected to select all of the dependent leaf nodes.

An entity designation 780 may allow the advertiser to type in the name of an entity to narrow down the list of available actions. For example only, a knowledge graph may include sets of entities for various industry verticals. As the advertiser types in an entity, an autocomplete display 784 may be shown, which is populated by various entities from the knowledge graph. Once an entity is selected, the list 760 may narrow to those actions relevant to that entity.

Developer Portal

Figure 10:
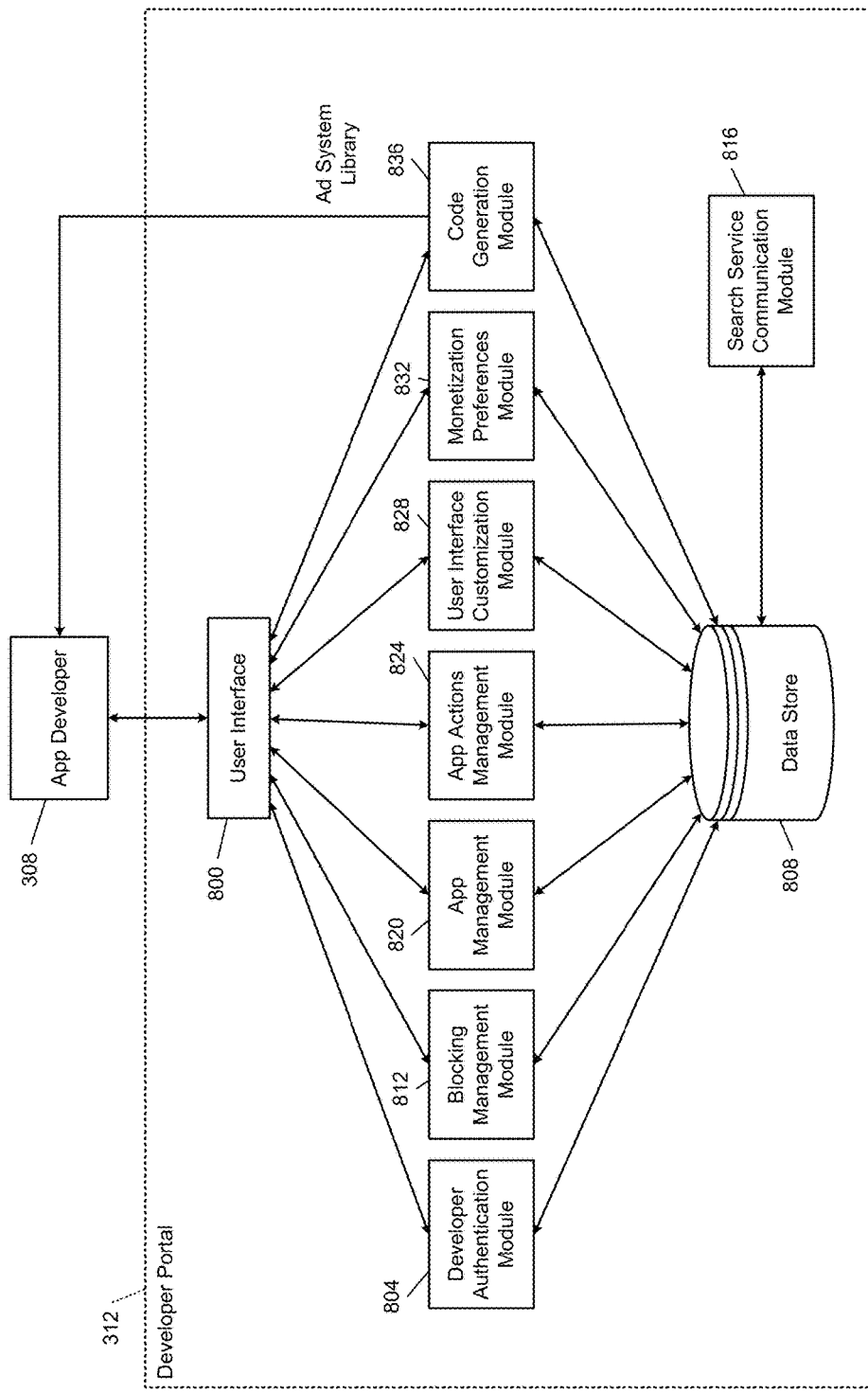
FIG. 10 is a functional block diagram of an example implementation of a developer portal.

In FIG. 10, a high-level functional block diagram of an example implementation of the developer portal 312 is shown. The developer portal 312 includes a user interface 800, which may be implemented as a website, for access by the app developer 308. A developer authentication module 804 stores credentials for various developers and securely authenticates each developer to the developer portal 312. The developer authentication module 804 may store credentials of app developers in a data store 808. Credentials are stored according to best practices, such as by adding a cryptographic salt value and using PBKDF2 (Password-Based Key Derivation Function 2).

An app blocking management module 812 allows for the formulation of patterns that match against apps desired to be blocked by the app developer 308. The patterns and explicitly-selected apps to block are stored in the data store 808, and may have associated metadata indicating whether those apps are blocked for all apps of the developer, for a specific app of the developer, or for a specific function of one or more apps. The entire list of apps available to be blocked may also be stored in the data store 808 and may be obtained from the search system 120.

A search service communication module 816 may periodically update the data store 808 based on the list of apps recognized by the search system 120. User-specific data may be encrypted while stored in the data store 808. In various implementations, general data, such as the list of apps, may be stored in unencrypted form.

An app management module 820 tracks various apps that each developer is working on, including names and other parameters of each app. An app actions management module 824 tracks what external functionality is being used for each app. The app actions management module 824 stores a list of the functions used in each app in the data store 808. The app management module 820 stores a list of apps developed by the app developer in the data store 808.

A user interface customization module 828 stores data controlling how each function or app will appear as specified by the developer. This may include graphical properties of a button, such as whether a shadow is present, whether a 3D effect is used, font, etc. In addition, preferences for labeling and presentation of sponsored apps may be set using the user interface customization module 828 and stored in the data store 808.

A monetization preferences module 832 stores monetization preferences for each app developer. In various implementations, monetization preferences may be different for each app of the app developer. An app developer, or an advertiser working on behalf of an app developer, may use the monetization preferences module 832 to book promotion of their app, even if their app does not take advantage of the external functionality features offered by the developer portal 312.

In other words, such developers can pay (according to, for example, cost per impression, cost per click, or cost per install) to have their app promoted by app developers who have implemented external functionality using the code offered by the developer portal 312. For this reason, the developer portal 312 may also be referred to as an advertiser portal. In various implementations, the developer portal 312 may charge a developer a fee (which may be assessed per app or per query sent to the search engine 120) to use the code and services from the developer portal 312.

A code generation module 836 generates code to be provided to the app developer 308. This code may include a custom SDK library based on data from the app blocking management module 812, the app management module 820, the app actions management module 824, the user interface customization module 828, and the monetization preferences module 832. The code generation module 836 may generate specific API calls to implement the preferences of the app developer. The code generation module 836 may also provide a software development kit to the app developer 308.

As preferences change in the data store 808, the search service communication module 816 may update the search system 120 with the updated preferences. In this way, the app developer may be able to alter which apps are blocked, which sponsored apps are shown, etc. for an app that has already been distributed.

Advertiser Portal

Figure 11:
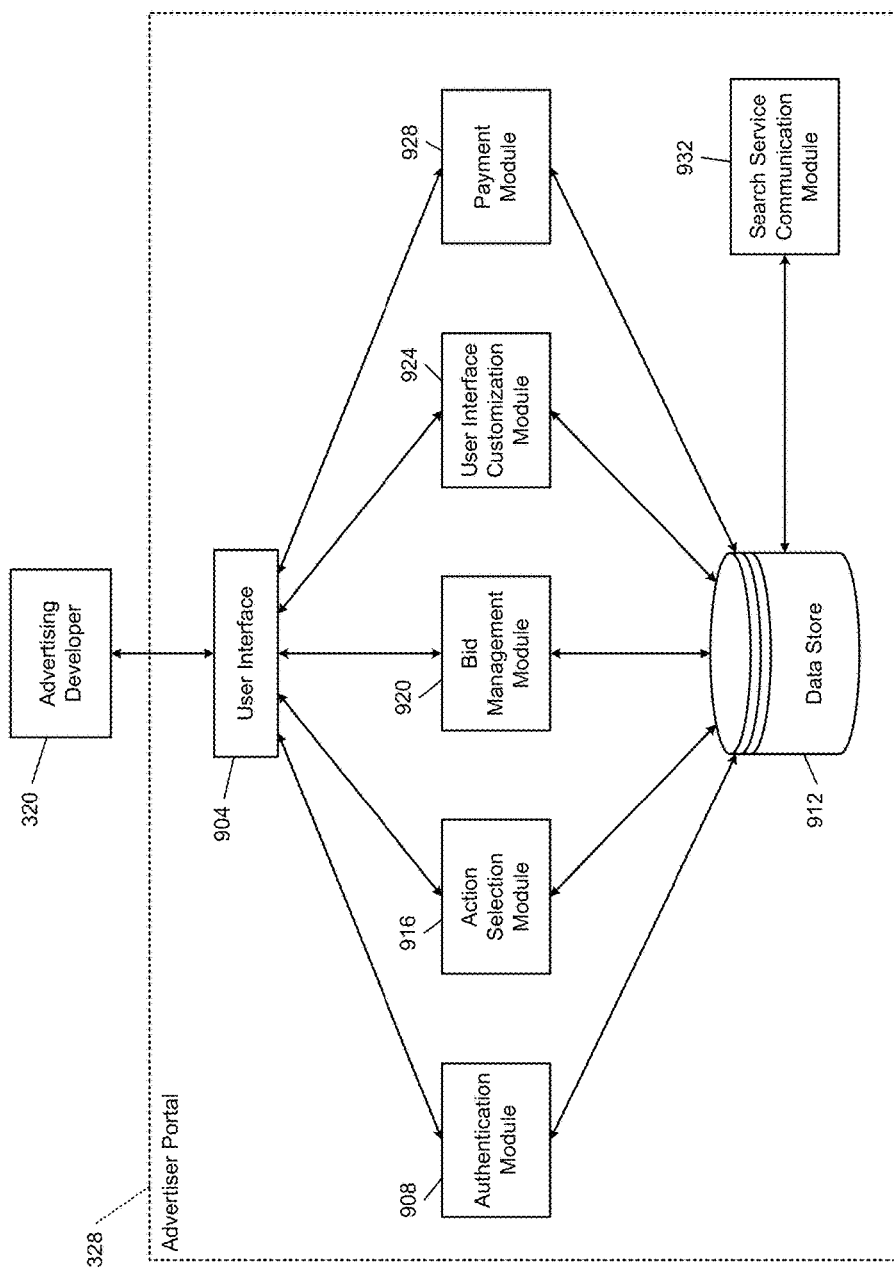
FIG. 11 is a functional block diagram of an example implementation of an advertiser portal.

In FIG. 11, an example implementation of an advertiser portal 328 includes a user interface 904 that communicates with an advertising developer (or, for short, advertiser), such as the developer 320 of FIG. 5. The user interface 904 allows the advertiser to authenticate with an authentication module 908, which stores user credentials in a data store 912. For example only, the credentials may be salted and then hashed with a secure cryptographic hashing algorithm, such as PPKDF2 (Password-Based Key Derivation Function 2).

An action selection module 916 allows the advertiser to specify actions for their campaigns. The action selection module 916 references a set of actions stored in the data store 912, which may be an ontology or other categorization. The action selection module 916 may also consult a knowledge graph stored in the data store 912 that has lists of entities for each vertical and has a mapping from each list of entities to the relevant actions within the action classification.

A bid management module 920 allows the advertiser to set bid prices for campaigns and also calculates and displays statistics about the campaigns. A user interface customization module 924 allows the advertiser to exercise control over how advertisements will be displayed. For example, the advertiser may be able to specify fonts, colors, etc., when returning results. In other implementations, the control of how results will be presented to a user is performed as part of an app onboarding process, which is described above.

A payment module 928 allows the advertiser to specify how ads will be paid for, manages the total cost of advertisements, such as per developer or per campaign, and may maintain a reserve to ensure available funds. A search service communication module 932 communicates information about bid prices and bid adjustments to the search engine 120 for use in calculating bids.

AD System Library

Figure 12:
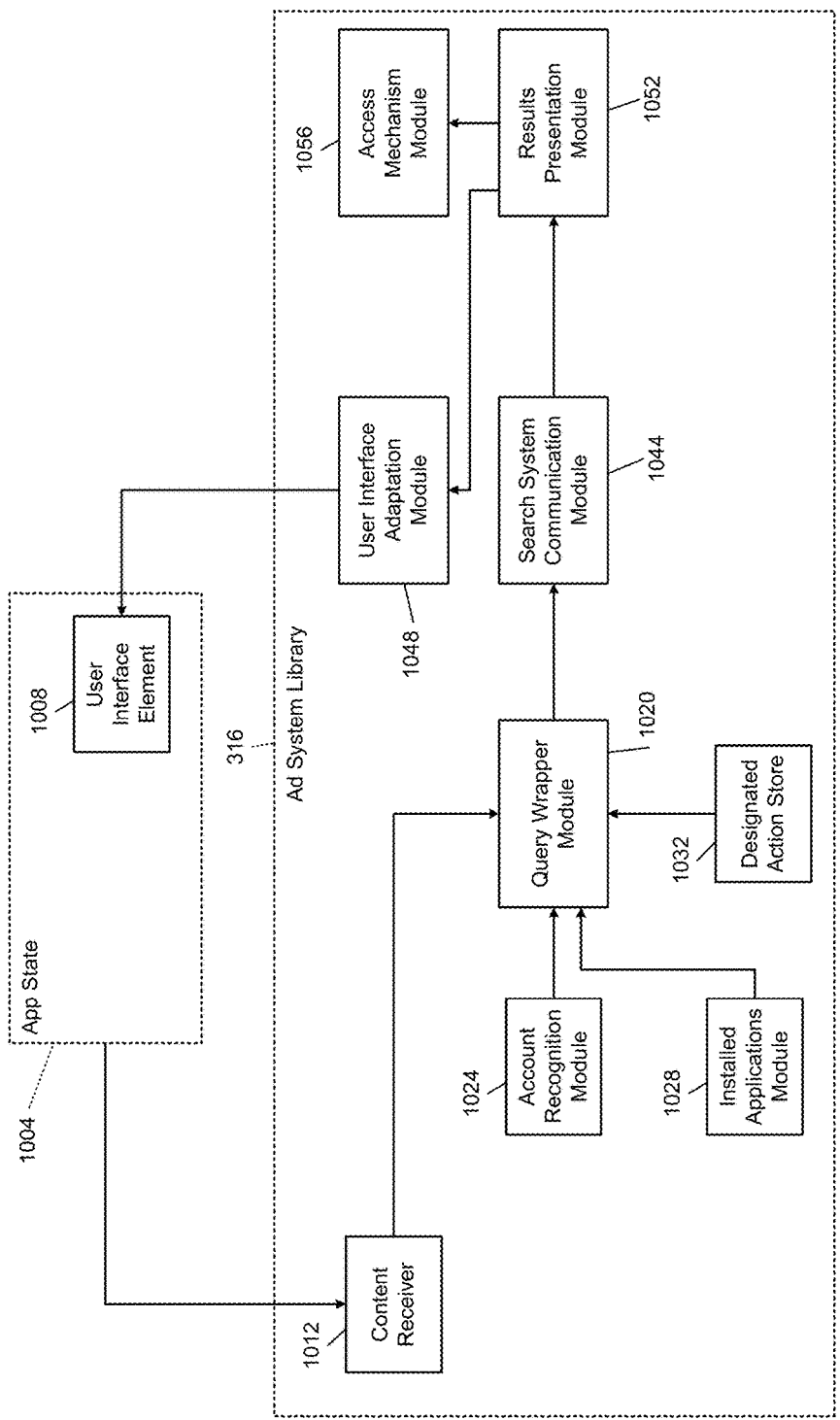
FIG. 12 is a functional block diagram of an example ad system library.

In FIG. 12, an example implementation of the ad system library 316 may be incorporated into an app by a developer. In other implementations, the ad system library 316 may take the form of web-based code that be downloaded as needed by a web page. In various implementations, the ad system library 316 may be offered as part of a software development kit (SDK), which may be implemented as a plugin for an integrated development environment.

A developer may add a button to one of the states (such as app state 1004) of the developer's app and include a call to the ad system library 316 in the code that instantiates the state. For example, the button may be user interface element 1008. The SDK may even automate creation and placement of the user interface element 1008 and may automatically associate the user interface element 1008 with the ad system library 316.

The developer passes information about the entity of app state 1004 to a content receiver 1012. A query wrapper module 1020 receives the entity information and adds it to a query wrapper.

An account recognition module 1024 identifies active user accounts on the user device. For example, an account with a streaming video operator may indicate that some or all movies from that provider can be streamed as part of the existing subscription service. The account recognition module 1024 provides this account data to the query wrapper module 1020. This account data may be used by the search engine 120 to score results, with results able to be serviced by existing subscriptions ranked higher than results that would require an additional subscription.

An installed applications module 1028 provides information on installed applications to the query wrapper module 1020. Similar to accounts, the installed applications allow the search engine 120 to adjust scores, such as by lowering bid prices of applications already installed.

A designated action store 1032 stores an identifier of the function or action designated by the developer during interaction with the developer portal 312. The designated functions are from the function ontology (such as the function ontology 500) and have specific identifiers known to the search engine 120. The identifiers may be different for each app state template in the app.

The query wrapper module 1020 combines data from the content receiver 1012, the account recognition module 1024, the installed applications module 1028, and the designated action store 1032 and provides the data to a search system communication module 1044.

The search system communication module 1044 transmits the query wrapper to the search engine 120 and receives advertisement objects from the search engine 120. A user interface adaptation module 1048 allows the user interface element 1008 to be modified, such as with graying out or hiding altogether, if no apps can perform the corresponding action. The user interface adaptation module 1048 also allows branding of the highest-bidding app to be added to the user interface element 1008.

A results presentation module 1052 receives the advertisement objects and controls the user interface adaptation module 1048. Upon user selection of the user interface element 1008, the results presentation module actuates an access mechanism module 1056. The access mechanism module 1056 enacts the specified access mechanism from the results. For example, this may include launching a web browser, opening an application, or opening a digital distribution platform application to allow a desired application to be installed.

Flowcharts

Figure 13:
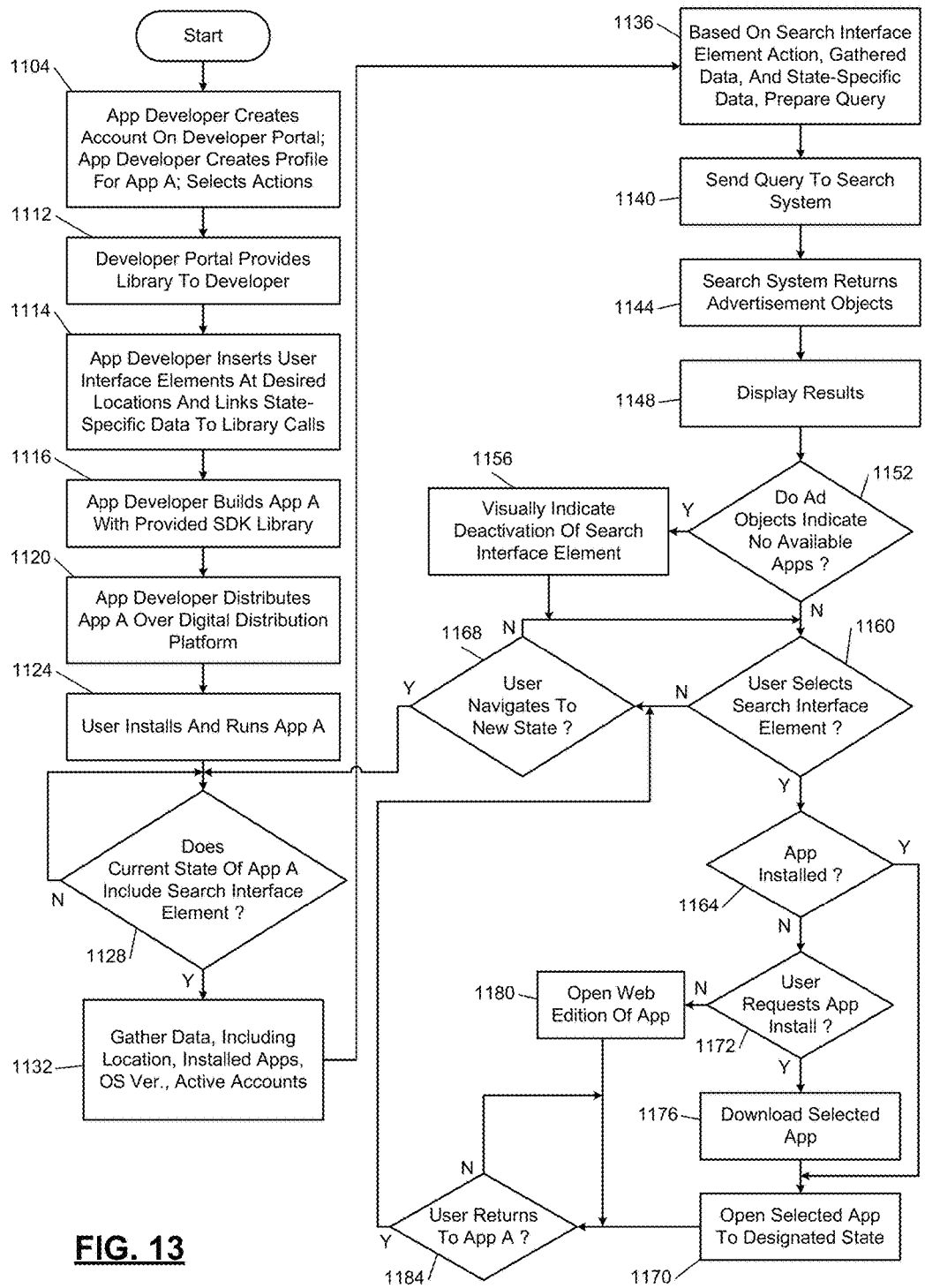
FIG. 13 is a flowchart of example integration and operation of a software object provided by the search engine.

In FIG. 13, an overall operational flowchart begins at 1104 where an app developer creates an account on the developer portal, creates a profile for a first app (App A), and selects actions for the developer portal to provide advertisements regarding. At 1112, the developer portal provides the ad system library to the developer for incorporation into App A.

At 1114, the developer inserts user interface elements at desired locations within states of App A and selectively links state-specific data to search interface elements. For example, the developer may supply a text title of a state to a search interface element in that state. As another example, for a search interface element adjacent to a movie theatre, the developer may supply a name and/or address of the movie theatre to the search interface element for formation of a query.

At 1116, the app developer builds App A with the provided code. At 1120, the app developer distributes App A over a digital distribution platform. Once App A is available on the digital distribution platform, a user can install and run App A at 1124. At 1128, control determines whether the current screen of App A includes a search interface element, such as an external functionality button. If so, control transfers to 1132; otherwise, control remains at 1128.

At 1132, control gathers context data from the user device, which may include one or more of the following: location, installed applications, operating system version, installed accounts, etc. At 1136, based on the action for the search interface element, gathered data, and state specific data, a query is prepared. When multiple search interface elements are present, the query may include the action research interface element or multiple queries may be prepared and sent. At 1140, the query is sent to the search system. At 1144, the search system returns advertisement objects.

At 1148, control displays results related to the advertisement objects, such as is shown in FIGS. 1-3. At 1152, if the advertisement objects indicate that there are no available apps for a particular action, control transfers to 1156; otherwise, control transfers to 1160. At 1156, control visually indicates the deactivation of the search interface element corresponding to the action that has no available apps. Control then continues at 1160.

At 1160, control determines whether the user has selected a search interface element, such as an action button. If so, control transfers to 1162; otherwise, control transfers to 1168. At 1168, control determines whether the user has navigated to a new state of app A. If so, control transfers to 1128; otherwise, control returns to 1160. At 1164, if the app returned in the advertising object for the selected search interface element is installed, control transfers to 1170; otherwise, control transfers to 1172.

At 1172, control determines whether the user requests the app to be installed. If so, control transfers to 1176; otherwise, control transfers to 1180. In various implementations, the user request may instead be user permission, where the user is prompted to approve or deny a suggestion for app installation. At 1180, control opens a web edition of the app. In situations where this is no web addition, an error message may be shown or other remedial action performed. Control then continues at 1184. At 1176, the selected app is downloaded, which may be referred to as deferred deep-linking. Control continues at 1170 where the selected app is opened on the user device to the designated state. Control continues at 1184. At 1184, if the user returns to app A, control transfers to 1168; otherwise, control remains at 1184.

Figure 14:
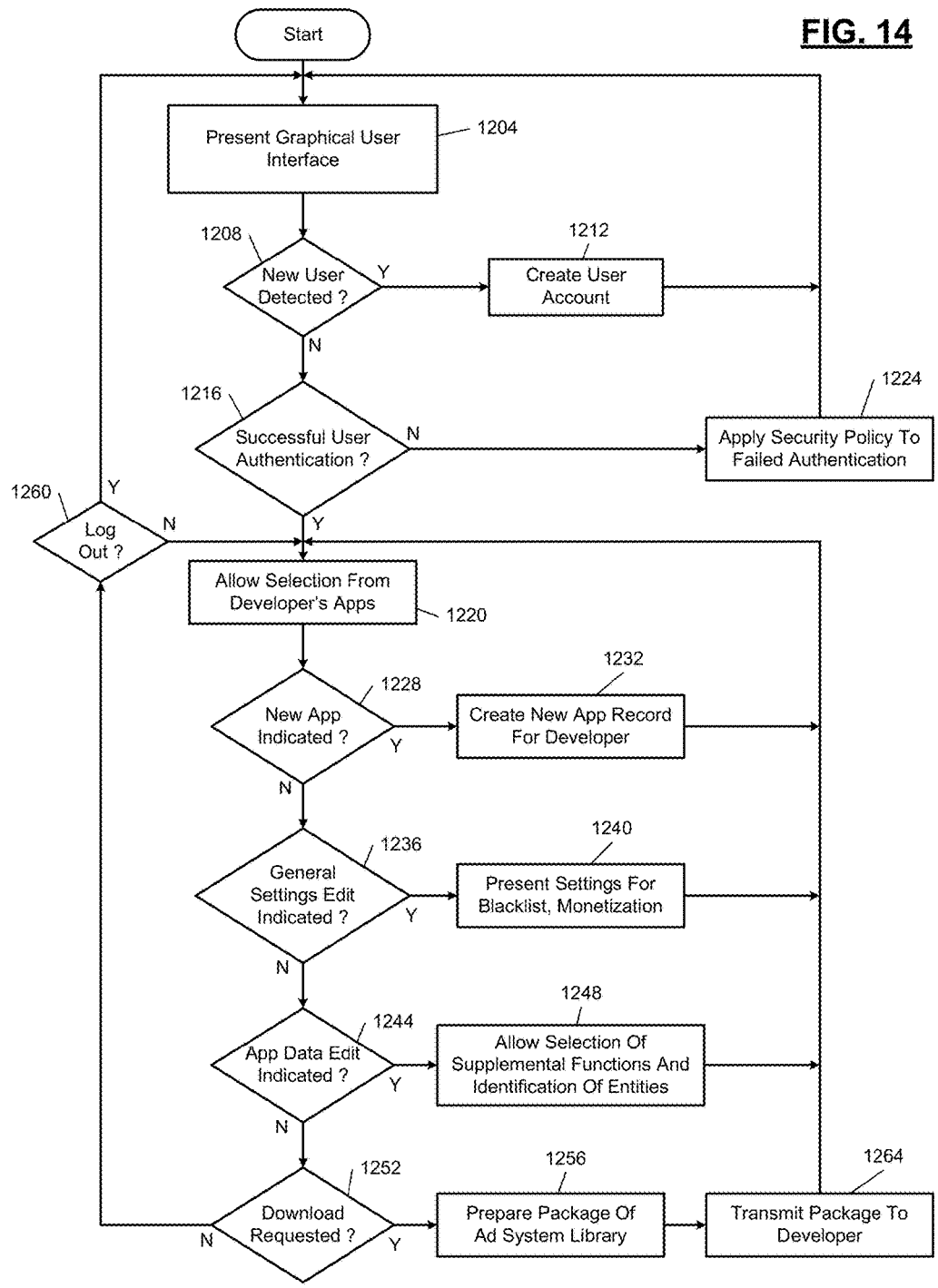
FIG. 14 is a flowchart of example operation of a developer portal.

In FIG. 14, example operation of a developer portal begins at 1204, where a graphical user interface is presented, such as by hosting a website. Control continues at 1208, where if a new user is detected, control creates a user account at 1212 and returns to 1204. If an existing user is detected, control transfers to 1216, where upon successful user authentication, control transfers to 1220. If the user does not successfully authenticate, control transfers to 1224. At 1224, a security policy is applied to the failed authentication.

For example only, the security policy may include exponentially increasing a time that the user has to wait before attempting to authenticate again. In addition, the security policy may include a set number of unsuccessful attempts before the user is prevented from logging in without manual intervention at the developer portal. Further, unsuccessful authentication may be logged and may be communicated to a predetermined email address of the user.

At 1220, control allows selection from among the developers' apps. At 1228, if a new app is indicated by the developer, control transfers to 1232; otherwise, control transfers to 1236. At 1232, control creates a new app record for that developer and control returns to 1220. At 1236, control determines whether the developer has indicated that general settings should be edited. If so, control transfers to 1240, where settings are presented for editing. These settings may include a global blacklist, monetization policies, etc.

Control then returns to 1220. If, at 1236, the developer has not indicated that general settings should be edited, control transfers to 1244. At 1244, control determines whether the developer has indicated that data corresponding to an app should be edited. If so, control transfers to 1248; otherwise, control transfers to 1252. At 1248, control allows for selection of supplemental functions, which indicate actions for which the developer wants to include advertisements. In addition, settings for already selected functions may be changed, such as function-specific blocked apps and user interface options. Control then returns to 1220.

At 1252, if a download has been requested, control transfers to 1256; otherwise, control transfers to 1260. At 1260, if the user logs out, control returns to 1204; otherwise, control returns to 1220. At 1256, control prepares a package, such as an ad system library, to implement the ad system functionality for the selected app. At 1264, control transmits the package to the developer for the developer's integration into an app under development. Control then returns to 1220.

Figure 15:
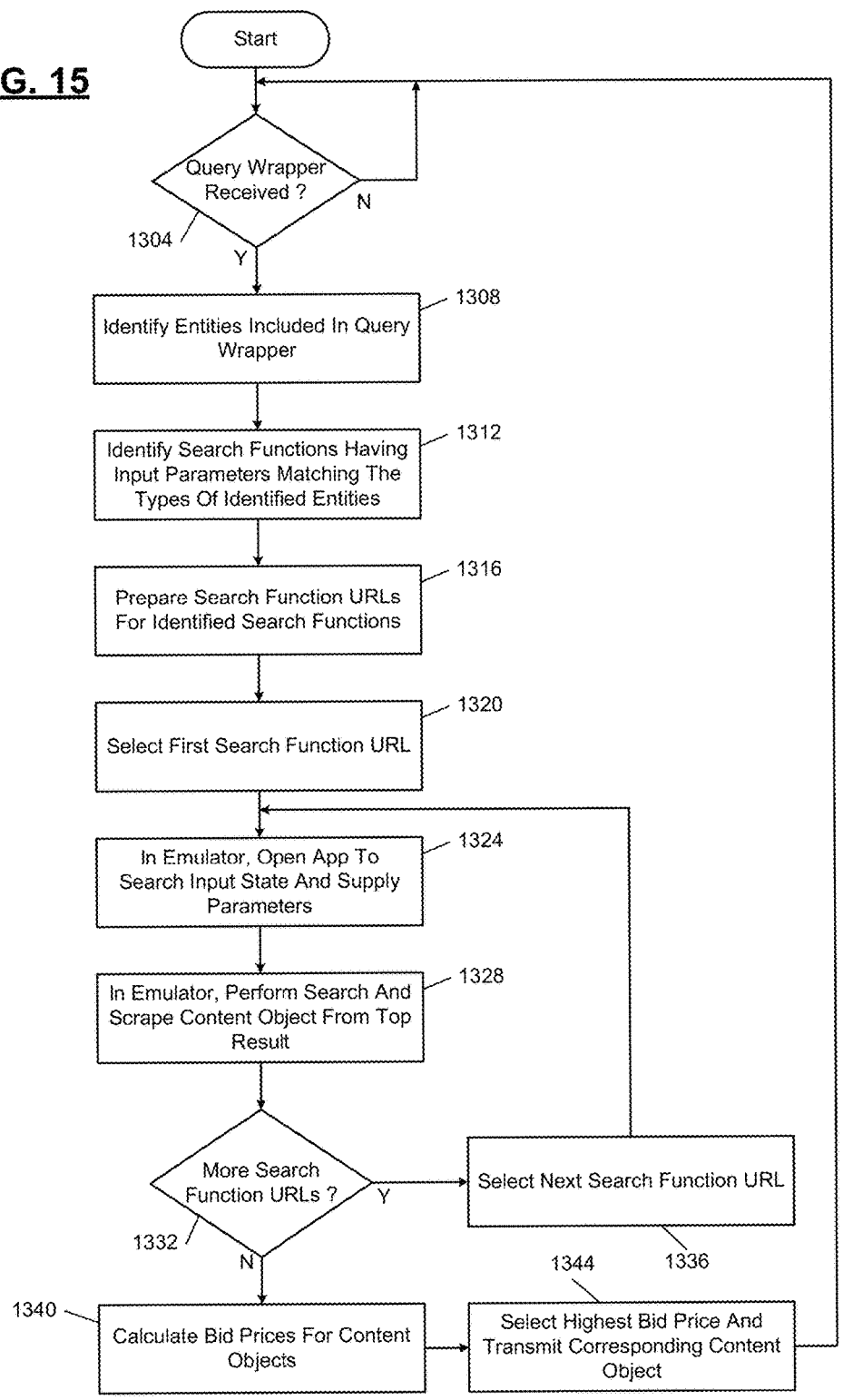
FIG. 15 is a flowchart of example operation of a search engine according to the principles of the present disclosure.

In FIG. 15, a flowchart depicts example operation of a search engine according to the principles of the present disclosure. Control begins at 1304 where control waits until a query wrapper is received. When the query wrapper is received, control transfers to 1308, where control identifies entities included in the query wrapper.

Control continues at 1312 and identifies functions having input parameters that require the types of entities identified in the query wrapper. For example only, a search function that requires a movie name and a date will be selected when the query wrapper includes text identified as being a movie name and a date.

Control continues at 1316 where search function URLs (Uniform Resource Locators) are prepared for the identified search functions. For example only, a search function URL may include an identifier of the search input state where the search functionality can be accessed and also an indication of parameters to be supplied to the search function, where the parameters are based on the query wrapper.

At 1320, control selects the first of the search function URLs. At 1324, control opens the app specified by the selected search function URL to the search input state specified. This app is executed in an emulator or in a hardware device under control of the search engine. Control then supplies parameters to the user interface elements of the search input state.

At 1328, control executes the search in the emulator, such as by actuating a user interface element (for example, a search button). Control selects the first result, assuming that the app will place the most relevant content first, and scrapes that first result to create a content object. At 1332, control determines whether there are more search function URLs. If so, control transfers to 1336; otherwise, control transfers to 1340. At 1336, control selects the next search function URL and returns to 1324.

At 1340, control calculates bid prices for each of the scraped content objects. As described in more detail above, the bid price may be a predetermined number adjusted based on various targeting parameters. As one example, the bid price may be increased when the user does not have the advertiser's app installed. This increased bid price reflects the greater likelihood that the advertiser's app may be exposed to a new user. In addition, bidding rules established by an advertiser may indicate that the advertiser does not want to be associated with particular apps. The bid prices for such advertisers may then be set to a negative number or simply removed from consideration all together.

Control continues at 1344, where the highest bid price is determined and the corresponding content object is transmitted to the sender of the query wrapper. In various implementations, multiple content objects may be returned, such as when the user is given a choice as shown in FIG. 2A or FIG. 2B. Control then returns to 1304.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A search system comprising:
a search function data store configured to store a plurality of records, wherein each record:
identifies search functionality of a respective application;
includes a path to reach a search input state corresponding to the identified search functionality within the respective application; and
includes an indication of required input parameters to be supplied in the search input state to access the identified search functionality;
a code generation module configured to provide a first software object to a first developer for incorporation into at least a first state of a first application, wherein the first software object includes instructions for:
upon the first state being accessed by a user, transmitting a query to a search system, wherein the query includes information indicating (i) an entity corresponding to the first state and (ii) an action to be performed on the entity;
receiving an advertisement object from the search system in response to the query, wherein the advertisement object includes an access mechanism that designates a state of an application;
selectively displaying a first user interface element in the first state based on the advertisement object; and
in response to selection by the user of the first user interface element, opening an application designated by the access mechanism to a state designated by the access mechanism;
a search function matcher configured to, in response to a first query from a user device, select a set of records from the search function data store;
a native search system configured to, for each record of the set of records:
control an emulator to navigate the application specified by the record to the search input state specified by the record;
supply the required input parameters to the search input state specified by the record;
perform a search; and
scrape content from a resulting state to produce a content object, wherein the content object includes a path to a first result specified by the resulting state;
a bid selection system configured to determine bid prices for each of the content objects from the native search system and select a highest bid price; and
a presentation system configured to transmit an advertisement object to the user device based on the content object corresponding to the highest bid price.

2. The search system of claim 1 wherein:
the first query includes context; and
the bid selection system is configured to determine the bid prices based on the context.

3. The search system of claim 2 wherein the context includes at least one of:
  a location of the user device; and
  an identification of operating system of the user device.

4. The search system of claim 1 wherein:
  the records of the search function data store are categorized by function;
  the first query includes an identifier of a specified function; and
  the search function matcher is configured to select records from the search function data store that match the specified function.

5. The search system of claim 1 further comprising:
  a user interest finder configured to receive the first query from the user device and identify one or more types of entities included in the first query,
  wherein the search function matcher is configured to select records from the search function whose required input parameters match the identified one or more types of entities.

6. The search system of claim 1 wherein, for each record of the plurality of records, the path includes a sequence of user interface interactions beginning with a home state of the respective application.

7. The search system of claim 1 wherein opening the application includes one of (i) opening a web browser on the user device for a web edition of the application and (ii) opening a native edition of the application on the user device.

8. The search system of claim 1 wherein, for each record of the set of records:
  the content object also includes text and an image;
  the text is unique to the first result; and
  the advertising object includes the text and the image.

9. The search system of claim 1 wherein each record of the plurality of records includes a mapping of the required input parameters to user interface widgets of the search input state.

10. The search system of claim 1 wherein the first software object includes instructions for, in response to no results being obtained for a first function, signaling non-availability of the first function by one of (i) hiding the first user interface element and (ii) lightening a shade of text of the first user interface element and disabling any action associated with the first user interface element.

11. The search system of claim 1 wherein the first software object includes instructions for displaying an indicator of the action as well as the application associated with the first user interface element.

12. The search system of claim 1 wherein:
  the presentation system is configured to transmit an advertisement object to the user device based on the content objects corresponding to N highest bid prices;
  N is an integer;
  the advertisement object includes N access mechanisms, each designating a respective state of a respective application; and
  the first software object includes instructions for:
    in response to selection by the user of the first user interface element, displaying a list of the N access mechanisms; and
    in response to selection by the user of a first access mechanism from the list, opening the respective application designated by the first access mechanism to the respective state designated by the first access mechanism.

13. The search system of claim 1 wherein:
  the first developer is a web developer;
  the first application is a website;
  the first state is a page of the website; and
  the first software object includes JavaScript instructions.

14. A method of operating a search system, the method comprising:
  storing a plurality of records, wherein each record:
    identifies search functionality of a respective application;
    includes a path to reach a search input state corresponding to the identified search functionality within the respective application; and
    includes an indication of required input parameters to be supplied in the search input state to access the identified search functionality;
  providing a first software object to a first developer for incorporation into at least a first state of a first application, wherein the first software object includes instructions for:
    upon the first state being accessed by a user, transmitting a query to a search system, wherein the query includes information indicating (i) an entity corresponding to the first state and (ii) an action to be performed on the entity;
    receiving an advertisement object from the search system in response to the query, wherein the advertisement object includes an access mechanism that designates a state of an application;
    selectively displaying a first user interface element in the first state based on the advertisement object; and
    in response to selection by the user of the first user interface element, opening an application designated by the access mechanism to a state designated by the access mechanism;
  in response to a first query from a user device, selecting a set of records from the stored records;
  for each record of the set of records:
    controlling an emulator to navigate the application specified by the record to the search input state specified by the record;
    supplying the required input parameters to the search input state specified by the record;
    performing a search; and
    scrape content from a resulting state to produce a content object, wherein the content object includes a path to a first result specified by the resulting state;
  determining bid prices for each of the content objects; and
  transmitting an advertisement object to the user device based on the content object corresponding to the highest bid price.

15. The method of claim 14 wherein:
  the first query includes context; and
  the method further comprises determining the bid prices based on the context, wherein the context includes at least one of:
    a location of the user device; and
    an identification of operating system of the user device.

16. The method of claim 14 wherein:
  the stored records are categorized by function;
  the first query includes an identifier of a specified function; and
  each of the set of records is selected from the stored records based on the categorization of the record matching the specified function.

17. The method of claim 14 further comprising:
  identifying one or more types of entities included in the first query, wherein each of the set of records is selected from the stored records based on the respective search function having required input parameters that match the identified one or more types of entities.

18. The method of claim 14 wherein, for each record of the plurality of records, the path includes a sequence of user interface interactions beginning with a home state of the respective application.

19. The method of claim 14 wherein opening the application includes one of (i) opening a web browser on the user device for a web edition of the application and (ii) opening a native edition of the application on the user device.

20. The method of claim 14 wherein, for each record of the set of records:
   the content object also includes text and an image;
   the text is unique to the first result; and
   the advertising object includes the text and the image.

21. The method of claim 14 wherein each record of the plurality of records includes a mapping of the required input parameters to user interface widgets of the search input state.

22. The method of claim 14 wherein the first software object includes instructions for, in response to no results being obtained for a first function, signaling non-availability of the first function by one of (i) hiding the first user interface element and (ii) lightening a shade of text of the first user interface element and disabling any action associated with the first user interface element.

23. The method of claim 14 wherein the first software object includes instructions for displaying an indicator of the action as well as the application associated with the first user interface element.

\* \* \* \* \*